US012598189B2

(12) United States Patent
Carre et al.

(10) Patent No.: US 12,598,189 B2
(45) Date of Patent: Apr. 7, 2026

(54) CONTENT COLLABORATION SYSTEM HAVING ACCESS CONTROLS FOR PUBLIC ACCESS TO DIGITAL CONTENT

(71) Applicant: Atlassian Pty Ltd., Sydney (AU)

(72) Inventors: Arthur Carre, San Jose, CA (US); Nidhi Raj Jayanarasimha, Seattle, WA (US); Suhasini Balaji Ramakrishnan, Union City, CA (US)

(73) Assignee: ATLASSIAN PTY LTD., Sydney (AU)

( * ) Notice: Subject to any disclaimer, the term of this patent is extended or adjusted under 35 U.S.C. 154(b) by 292 days.

(21) Appl. No.: 18/398,000

(22) Filed: Dec. 27, 2023

(65) Prior Publication Data

US 2025/0220018 A1     Jul. 3, 2025

(51) Int. Cl.
| | |
|---|---|
| *G06F 15/173* | (2006.01) |
| *G06F 16/957* | (2019.01) |
| *H04L 9/40* | (2022.01) |
| *H04L 67/306* | (2022.01) |

(52) U.S. Cl.
CPC ........ *H04L 63/102* (2013.01); *G06F 16/9577* (2019.01); *H04L 63/104* (2013.01); *H04L 67/306* (2013.01)

(58) Field of Classification Search
CPC ... H04L 63/102; H04L 63/104; H04L 67/306; G06G 16/9577

USPC .......................................................... 709/225
See application file for complete search history.

(56) References Cited

U.S. PATENT DOCUMENTS

| | | | |
|---|---|---|---|
| 2007/0168292 A1* | 7/2007 | Jogand-Coulomb | ....................... G06F 21/6218 705/52 |
| 2012/0272292 A1* | 10/2012 | Chabbewal | ............. H04L 63/08 709/224 |
| 2013/0239228 A1* | 9/2013 | Cinarkaya | ............. G06F 16/951 726/27 |
| 2015/0153916 A1* | 6/2015 | Naderi | .................. G06F 3/0483 715/206 |
| 2025/0106217 A1* | 3/2025 | Alagianambi | .......... G06F 9/451 |

* cited by examiner

*Primary Examiner* — Alan S Chou
(74) *Attorney, Agent, or Firm* — Brownstein Hyatt Farber Schreck, LLP

(57) ABSTRACT

A content collaboration system for creating and providing secure content for authenticated users and also provides access to designated content for unauthenticated or unlicensed users. The designated content remains synchronized with changes made by authenticated users and may be served by a content caching system. The designated content may also be specially rendered without macro instruction sets or embedded content for unauthenticated users and rendered with full content for authenticated users. Control of publicly available content is managed using a hierarchical control scheme, which can provide enterprise-wide visibility and control of publicly accessible content.

23 Claims, 12 Drawing Sheets

100

104 — CLIENT DEVICE
104c — DISPLAY
104b — MEMORY
104a — PROCESSOR

106 — CLIENT DEVICE
106c — DISPLAY
106b — MEMORY
106a — PROCESSOR

120 — {}

122 — {}

HOST SERVER(S)     102

108 — GATEWAY SERVICE
108a — RESOURCE ALLOCATION(S)

118

110 — PLATFORM BACKEND
110a — RESOURCE ALLOCATION(S)

112 — AUTHENTICATION SERVICE
112a — RESOURCE ALLOCATION(S)

114

116

800

1000

CONTENT COLLABORATION SYSTEM HAVING ACCESS CONTROLS FOR PUBLIC ACCESS TO DIGITAL CONTENT

TECHNICAL FIELD

The described embodiments relate generally to a content collaboration system providing secure content using a web-based interface and, more specifically to providing limited public access to designated content of the content collaboration system.

BACKGROUND

Modern enterprises retain large volumes of digital content created, managed, or modified by employees or customers. In many cases, enterprises license access for their employees or customers to one or more collaboration platforms to generate, view, and/or modify digital content. Conventionally, content stored and served by these traditional platforms is either (1) shared content (e.g., publicly available) accessible via a public address or (2) secure content (e.g., not publicly available) accessible only to authenticated users of a platform.

In some cases, it may be necessary to share a secure content item stored by a collaboration platform with one or more specific third parties or publicly. Removing authentication requirements in respect of secure content items on an ad hoc basis may be reliably difficult to document and control, potentially resulting in inadvertent disclosure. Generating static copies of secure content and assigning public addresses to those copies can result in the shared content quickly being rendered stale. As a result, many conventional content collaboration platforms do not adopt publicly-shared content functionality and many, by design, attempt to prevent or prohibit export or sharing of secure content.

However, prohibiting sharing of content, whether by policy, by network security controls, or by collaboration platform configuration or design, often motivates users of a platform to circumvent controls and policy (or to ignore best practices), potentially exposing an enterprise to information disclosure liabilities.

SUMMARY

Some example embodiments are directed to a computer-implemented method of providing user-generated pages of a content collaboration platform. In response to a first user input at a graphical user interface of the content collaboration platform, the system may cause creation of a page comprising user-generated content. The user-generated content may include text content; selectable graphical objects, each selectable graphical object is user-selectable to cause redirection to a respective target content item and display content extracted from the target content item; and one or more graphical items generated by a set of macro instructions associated with the page. In response to a first request to view the page from an authenticated user, the system may cause display of the page in a first client application associated with the authenticated user, the page displayed with the text content, the selectable graphical objects, and the one or more graphical items. In response to a second request to view the page from an unauthenticated user, the system may suppress display of the page in a second client application associated with the unauthenticated user. In response to a second user input to the graphical user interface, the system may modify a public-status permission profile of the page and, in accordance with the public-status permission profile granting access, enable public access to the page for unauthenticated users. A public address may be generated comprising a first domain portion and a second domain portion corresponding to an external content identifier of the page. Subsequent to enabling public access to the page and in response to a third request to view the page via the public address from the unauthenticated user, the system may obtain the public-status permission profile of the page using the external content identifier and an internal content identifier of the page and, in response to an evaluation of the public-status permission profile indicating that public access is currently granted, the system may cause display of the page in the second client application associated with the unauthenticated user, the page displayed with the text content and without the selectable graphical objects and the one or more graphical items.

In some implementations, the public-status permission profile is based on a hierarchical permission scheme comprising: a first permission level based on a first permissions profile of the page; a second permission level based on a second permissions profile of a page space that includes the page and a plurality of other pages; a third permission level based on a third permission profile of a platform hosting the page space and a plurality of other page spaces; and a fourth permission level based on a fourth permission profile of a tenant providing the platform and a plurality of other platforms. In accordance with the first, second, third, and fourth permission levels permitting unauthenticated user access, the public-status permission profile may indicate that public access is currently granted. The public-status permission profile may be stored in a cache as a cached permission profile. The cached permission profile may be modified in response to one or more events generated by the content collaboration platform. The one or more events include one or more of: a movement of the page from a first page space to a second page space; a change in ownership of the page with respect to one or more system users; or a change to a the first, second, third or fourth permission levels.

In some implementations, causing display of the page in the second client application further comprises: checking for a cached version of the page in a page cache of the content collaboration platform. In response to the cached version of the page being stored in the page cache, the system may retrieve at least a portion of the user-generated content from the page cache. In response to the cached version of the page being absent from the page cache, the system may retrieve at least a portion of the user-generated content from a page store of the content collaboration platform and causing retrieved user-generated content to be stored in the page cache. The page may be a first page and the public address may be a first public address. In response to a fourth request to view a second page using a second public address from the unauthenticated user, the system may check for a cached version of the second page in the page cache of the content collaboration platform. In response to the cached version of the second page being stored in the page cache, the system may retrieve respective user-generated content from the page cache. In response to the cached version of the second page being absent from the page cache and in response to a request criteria being satisfied, the system may retrieve the respective user-generated content of the second page from the page store of the content collaboration platform and causing the respective user-generated content to be stored in the page cache. In response to the cached version of the second page being absent from the page cache and in response to the request criteria not being satisfied, the system may deny access to the second page. In some implementations, the request criteria includes a number of times a respective page can be requested within a predetermined time period, and the request criteria is not satisfied when a particular number of times the second page has been requested within the predetermined time period exceeds a request threshold.

In some embodiments, the target content item of the selectable graphical objects is another page provided by the content collaboration platform; and the one or more graphical items include content obtained from a platform different than the content collaboration platform.

In some embodiments, the first client application is a first instance of a browser application operating on a first client device of the first user; and the second client application is a second instance of the browser application operating on a second client device of the second user.

Some example embodiments are directed to a computer-implemented method of providing user-generated pages of a content collaboration platform. In response to a first request to view a page of the content collaboration platform from an authenticated user, the system may cause display of the page in a first client application associated with the authenticated user. The page may be displayed with text content and one or more graphical items generated by a set of macro instructions associated with the page. In response to a second request to view the page from an unauthenticated user, the system may block display of the page in a second client application associated with the unauthenticated user. In response to a user input to a graphical user interface associated with the page, the system may enable public access to the page for unauthenticated users by modifying a first permissions profile of the page. The system may generate a public address comprising a first domain portion and a second domain portion corresponding to a shared content ID of the page. Subsequent to enabling public access to the page and in response to a third request to view the page via the public address from the unauthenticated user, the system may: determine a first permission level based on the first permissions profile of the page; determine a second permission level based on a second permissions profile of a page space that includes the page and a plurality of other pages; determine a third permission level based on a third permission profile of a platform hosting the page space and a plurality of other page spaces; and determine a fourth permission level based on a fourth permission profile of a tenant providing the platform and a plurality of other platforms. In accordance with the first, second, third, and fourth permission levels allowing public access, the system may cause display of the page in the second client application associated with the unauthenticated user, the page displayed with the text content and without the one or more graphical items.

In accordance with the fourth permission level disabling public access, the system may prevent public access to any pages hosted on behalf of the tenant. In accordance with the third permission level disabling public access, the system may prevent public access to any pages of the platform. In accordance with the second permission level disabling public access, the system may prevent public access to any pages of the page space. Subsequent to enabling public access to the page, the system may maintain a secure address for the page and the public access to the page. Subsequent to enabling public access to the page and in response to a fourth request to view the page via the secure address, an authentication of a requesting user may be verified and, in response to the requesting user having a valid authentication, the system may cause display of the page with the text content and the one or more graphical items generated by the set of macro instructions associated with the page.

In some embodiments, a graphical item of the one or more graphical items generated by the set of macro instructions associated with the page includes an embedded graphic. The embedded graphic may be extracted from a content item hosted by an external platform that is separate from the content collaboration platform.

In some embodiments, a graphical item of the one or more graphical items generated by the set of macro instructions associated with the page includes a selectable graphical object. The selectable graphical object may be user selectable to cause redirection of the graphical user interface to a respective content item.

Some example embodiments are directed to a computer-implemented method of providing user-generated pages of a content collaboration platform. In response to a first request to view a page of the content collaboration platform from an authenticated user, the system may cause display of the page in a first client application associated with the authenticated user. The page may be displayed with page content including text content and one or more graphical items linked to other content items. In response to a second request to view the page from an unauthenticated user, the system may prevent display of the page in a second client application associated with the unauthenticated user. In response to a user input with respect to a graphical user interface displaying the page, the user input associated with a request to modify a first permission profile of the page to allow unauthenticated user access, the system may: determine a second permission level based on a second permissions profile of a page space that includes the page and a plurality of other pages; determine a third permission level based on a third permission profile of a platform hosting the page space and a plurality of other page spaces. In accordance with the first, second, and third permission levels allowing unauthenticated user access, the system may modify the first permission profile to allow unauthenticated user access, and generate a public address comprising a first domain portion and a second domain portion corresponding to a content identifier of the page. Subsequent to modifying the first permission profile to allow unauthenticated user access and in response to a third request to view the page via the public address from the unauthenticated user, the system may retrieve at least a portion of the page content using the second domain portion and cause display of the page in the second client application associated with the unauthenticated user. The page may be displayed with the text content and without the one or more graphical items linked to other content items.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
FIG. 1 depicts a simplified system for providing content items of a content collaboration platform.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to content collaboration platforms. Specifically, platforms that facilitate sharing of digital information or content between users accessing the platform and one or more non-users of the platform. Herein, a user of a platform may be referred to as an "authenticated user" and a non-user of a platform may be referred to as an "anonymous user," "unauthenticated user," or "non-authenticated user."

In this manner, embodiments described herein relate to systems and methods in respect of content collaboration platforms that facilitate sharing of content between authenticated users and anonymous users.

In particular, embodiments described herein relate to sharing digital content in web-based collaboration platforms specifically configured to store confidential, private, or otherwise protected information (herein, generally "secure content"). For example, a content collaboration platform may be configured as a documentation platform by an organization to be used by its employees to memorialize, describe, and record completion of work. In these configurations, different teams of employees can create and modify digital content stored (and served) by the web-based platform so that other teams of employees can access and use that secure content at a later time.

As one example, a design team may leverage an organization's documentation platform to document product specifications while a developer group of the same organization tracks progress in implementing those specifications. In other cases, a documentation platform may be used to store and present company financial information, human resources or benefits information, trade secret information, and the like.

In this manner, collaboration platforms may be understood, generally and broadly, as software tools and services, typically used by an organization or enterprise, to create, store, modify, exchange, and present information internal to that organization. Such information is typically protected from external access by design; third parties should not have access to information or content internal to an organization. More simply, only authenticated users are permitted to access secure content. Anonymous users are denied access to secure content, by design.

Although many conventional content collaboration platforms are intentionally designed with authentication and authorization to prevent unauthorized external access, circumstances exist in which an organization or an employee of an organization may benefit from sharing digital content external to the organization in a reduced friction manner that does not require external users to create accounts with the organization. For simplicity of description, content that is available to any anonymous or unauthenticated user may be referred to as "shared content" or "public content" herein.

For example, an organization may store or summarize financial reports within a content collaboration platform used by that organization. While such reports are being prepared, information in respect of those reports may be secure content, not accessible externally. Once the reporting is completed, however, it may be more convenient and efficient to share this information externally via the content collaboration platform itself than to create a fixed web page, to create and host a static file, or the like.

In other cases, an organization may engage one or more contractors that may, periodically, be required to access or review certain information stored by a content collaboration platform. In other cases, an employee of the organization may prefer to temporarily mark a particular secure content item or page for sharing so that the page may be easily presented during a conference or in a similar temporary context.

Broadly, it is often convenient to equip content collaboration platforms with features supporting external and/or public content sharing, despite that such platforms are conventionally designed specifically to prevent such access.

One potential solution is to implement reduced-friction registration and sign-on for unauthenticated users. More simply, a system may define reduced permissions user accounts and require anonymous users to register before sharing content. However, anonymous users may be hesitant to share information such as email addresses or names to register a limited purpose account. In addition, collecting personally identifying information to facilitate creation of even limited-access accounts can expose an organization to data breach liabilities and/or data privacy concerns, introducing additional costs and data management expense.

Another potential solution is to support tagging particular pages or content items (e.g., media, files, documents, and so on) as publicly accessible. In this instance, the system may create a static copy of the subject content item or page (potentially moving the copy to another system or location) and assign an URL to the static copy of the content item. In this manner, any web browser user can provide the URL to access the static copy. Many such systems obfuscate, hash, or otherwise randomize portions of public URLs to prevent unintended path or file enumeration, but this may not be required of or implemented by all systems. Such configurations may be referred to as content collaboration systems configured to create "static copies" of shared content.

Another potential solution is to assign a public URL for the original content. In these examples, a gateway service or other similar service can serve as a reverse proxy. Specifically, the gateway service may be configured to: receive requests for public links as input; translate (e.g., via look-up table) received public links to internal links or resource addresses; and query an appropriate internal endpoint to retrieve the content to serve to the original requester. Such configurations may be referred to as content collaboration systems configured to operate as "reverse proxies" in respect of shared content. In other embodiments, such systems can be referred to as creating "alias" URLs for shared content.

A system may permit access to any user who requests access via a particular URL. Such configurations may be referred to as "open access" configurations. Other systems may permit sharing of content on a more limited basis. For example, some systems permit access to public content (e.g., via static copies or via reverse proxies) only from certain IP address blocks, from browsers presenting specific user-agents, from certain domains originating in particular geographies, and so on. In other cases, an email address may be required to be provided as single factor authentication (potentially introducing data privacy and retention concerns, as noted above). Such configurations may be referred to as "limited access" configurations in which only some anonymous users can access shared content served by the content collaboration platform.

However, some of these system solutions—whether configured as limited or open access, whether configured to operate with static copies or via alias URLs—have several downsides and risks, many of which are introduced below.

For example, a static configuration can quickly become stale as changes to underlying content is made. Similarly, a reverse-proxy/alias URL system can quickly break (i.e., URLs can become stale) if URL structures, domain names, or the like are changed. To account for this possibility, many alias URL systems employ large lookup tables that maintain backward-compatibility. As such systems grow, responsiveness decreases.

For example, in some cases, a system can be configured to permit any authenticated user having a particular role (e.g., page manager, admin, content creator, and so on) to determine whether to enable public sharing of a particular page. This functionality can often lead to unintentional sharing of confidential, private, personal, or trade secret information. For example, an incautious or untrained user may accidentally enable sharing of content. In other cases, a user may neglect to withdraw previously-granted sharing permission at an appropriate time. Further, because of the ad hoc nature of public sharing in such systems, it may be difficult or impossible for a site admin to determine, in real time, what pages are publicly accessible and what pages are not publicly accessible without computationally expensive internal enumeration of all available pages.

In addition, shared content may be changed, modified, deleted or otherwise updated form time to time. In many cases, shared content may be rendered out-of-date or stale as a result of such updates, significantly mooting the purpose of sharing for productivity or information purposes. In other cases, underlying content may be changed or updated to include content or information that should not be shared. For example, a page including a list of executive names may be published publicly for open access. At a later time, an inadvertent or intentional update may add home address or compensation information to the same page, which, because of the previously-granted access, in turn is also made publicly available. As with previously described problems, this change or update to shared information may not be readily visible to site admins without a detailed manual audit, which may be time consuming and expensive.

In yet other examples, inadvertent sharing may occur due to systems that support permissions inheritance for hierarchically-organized or stored content. For example, some collaboration tools organize information in a hierarchical structure that may include such container entities as sites, spaces, and pages. In these examples, a site may have multiple spaces, a space may include multiple pages, and so on. Other systems may adopt a file and folder architecture in which pages are presented within particular folders, which in turn may be presented within other folders. In yet other examples, such as in project management tools, a product may include multiple projects, each of which may include multiple epics, stories, or the like, each of which in turn may include multiple tasks, issues, or action items.

Regardless of organizational paradigm, permissions inheritance may introduce many unintended behaviors in conventional systems. For example, a site admin may inadvertently mark a site-level object for public sharing. In a permissions inheritance system, every space within the public site and every page within each space thereof may also be made publicly accessible. In yet other cases, a project manager may mark a project-level page as public, ignorant of the secondary effect of causing all tracked issues associated with that project to be made publicly accessible.

In yet other examples, certain digital content items stored and served by a system can include links or references to other resources that are not intended for public sharing (e.g., organization-internal links). Arguments, variables, and/or path components of such links may inadvertently disclose database or content structure information by exposing certain identifiers or paths or path parts in the URL itself. For example, although often not advisable, some organizations or employees may permit, either intentionally or accidentally, unauthenticated access to internal databases, sites, or services. As an example, an organization directory database may be exposed via a microservice responsive to GET requests. In this example, queries, tables, identifiers, and the like can all be encoded as address arguments in the GET request. As an example, a URL to an internal resource linked in a shared page may be:

https://sub.org.tld/
?q=SELECT%20first_name%20FROM%20employees

In this example, an SQL-formatted query requesting contents of a column named "first_name" from a table named "employees" is provided as a GET request argument. In this example, the service may be configured to provide an HTML-formatted table including this information, which may be useful to employees internal to the organization.

However, if this URL is pasted as text into a shared page (even if the microservice returns a 403 or 404 server code (or the like) in response to an external request of this URL) the text of the link itself may expose important structural information about databases used by the organization. Specifically in this case, it may be exposed that a table named "employees" exists and that the table likely includes a column named "first_name." In these and similar examples, a system cannot readily detect that content of a shared page includes, or has been changed to include, a link or other reference to an internal resource.

In yet other examples, certain content may be rendered with a preview or thumbnail. For example, a link to another site may be rendered with an image thumbnail preview of the linked site. In other cases, a link to a video file or stream may be rendered as a thumbnail graphic. In these examples, thumbnail images are often cached for faster rendering. This may present a disclosure problem if the underlying content were an internal page. More simply, some content collaboration systems render page previews and cache those previews. In many cases, a cached preview may be visible when a shared page including previewed content is accessed by an external third party.

In yet other examples, some content collaboration platforms may be structured as monolithic or at least partially monolithic web applications. More simply, one or more critical services of the conventional content collaboration platform is provided by the same software instance and thus if the software instance crashes for any reason, the entire platform is affected. Although monolithic architecture is common, it may introduce additional challenges for public sharing. Specifically, a shared page may be virally shared dramatically increasing request volume over a short period of time, overloading the monolith. In these examples, a virally-shared page may cause the collaboration platform to crash, restart, or otherwise fall offline.

As such, in view of the foregoing, it may be appreciated that some solutions for providing a system with public sharing features—whether open access features or limited access features—have several disadvantages and weaknesses. In particular, in some systems: static copies of content may become stale; live-updated shared content may be updated or changed to include content that should not be shared; permissions inheritance may have unintended effects; a comprehensive real-time list of all public content may not be readily accessible (and thus admin-level master kill switches to prevent all or some sharing on an emergency basis may be difficult to implement); thumbnails or other custom-rich rendering or interface decoration may inadvertently disclose confidential information; monolithic architectures may be vulnerable to publicly-shared pages going viral; and so on.

To reduce the foregoing risks and challenges, some systems may not permit public sharing of secure content at all. In such configurations, however, users are often motivated to circumvent security controls (and/or policies) in order to share information, introducing a significant security blind spot for an organization.

For example, some conventional content collaboration platforms do not permit public sharing, but do permit export of digital content as a static file, such as a PDF document. In these cases, any user can create a PDF and share that PDF with any number of third parties, post the PDF to a file sharing service, post the PDF publicly online, and so on. The organization retains no control over sharing of the PDF or its underlying content whatsoever.

To address this concern, some conventional content collaboration platforms do not permit export of content at all. In these cases, employees are often motivated to print content (e.g., physically via a print, or printed to file such as a PDF), and share the resulting digital or physical document with others.

Generally and broadly, it may be appreciated that content sharing features are challenging to implement, present significant information disclosure risk, and in many cases are functionally required so as to retain control as effectively as possible over content that is likely to be inevitably shared regardless of policy or security controls.

To address these and other disadvantages of conventional configurations, embodiments described herein relate to a system and method for real-time management of permissions of shared content served by a content collaboration platform. Specifically, in response to receiving an instruction to mark certain content as publicly-accessible, embodiments described herein assign a share identifier, which may be a unique string of characters such as a UUID, a hash, token, or any other suitable unique alphanumeric string.

The share identifier is thereafter associated with (and/or to) each content identifier assigned by the system in respect of digital content associated with the content to be shared. As an example, a single page may include paragraphs, media, links, and other items each of which may be associated with different content identifiers. For embodiments described herein, a single share identifier can be associated with all content identifiers that collectively define digital content a user of the system intends to share. For example, a shared page may be associated with a single share identifier, and each of the content items (e.g., media, paragraphs, formatting, and so on) defining and/or within that page can be individually associated with that single shared identifier.

In addition, in many embodiments, a share identifier can be associated to content types of each content identifier. For example, a paragraph content item may have a different content type than an external media file. In other cases, links to other content can have a different content type than an inline image within a page. Many configurations are possible. Broadly, a share identifier can be associated with both content identifiers and content type identifiers.

Once a share identifier is assigned, a corresponding public URL can be generated in which the share identifier is provided as a URL argument or path part (e.g., a GET request address), thereby permitting simple access and sharing via the link itself. In some cases, a shared content URL (including a share identifier) can be masked behind a URL shortening service, but this is not required of all embodiments.

In this manner, public URLs generated by a system as described herein all have substantially the same form and format, regardless of underlying content being shared. For example, a public URL to a shared page takes the same form and format as a public URL to a shared issue which may also take the same form and format as a public URL to a shared media file. This generalization of public URL structure provides increased security by obfuscating content type.

In addition, embodiments described herein include a shared content renderer separate from and distinct from an internal/standard content renderer. The shared content renderer can be configured to preprocess all content items (or types) of digital content flagged to be shared so as to redecorate the content (e.g., according to administrative or site-level preferences), to omit particular content types entirely, to skip rendering of affordances related to functionality of the system (e.g., edit buttons, header ribbons, page trees and the like), and/or to prevent rendering or to strip portions or entireties of content items that are not shareable by setting or administrative configuration and/or recognized to include a link to or a preview of internal content, such as content portions that match a regular expression test as likely being personally identifying information, an internal link or project name, or the like.

As a result of this architecture, a request for a public URL (from an anonymous user or otherwise unidentified/unauthenticated client device) can cause a system as described herein to execute operations of a method of rendering a public page, or more generally a method of rendering shared content.

Initially, a system as described herein receives a request from an anonymous client device via one or more networking protocols. The request can be received by a gateway or API gateway or other request interpreter or firewall device or service. The initial recipient of the request can parse the request URL to determine whether a share identifier (more briefly, a share "id") is included within the URL.

In accordance with a determination that the request URL does include a share id—or at least contains a string likely to be a share id (e.g., an alphanumeric string including suitable length, character set, and so on)—the system can operate to convert the share identifier into one or more content identifiers associated with, and/or mapped to, that share identifier. Specifically, the gateway or initial recipient of the request can generate a second request to an internal service configured to access a lookup table or other database that associates share ids to content identifiers (more briefly, content "ids").

In this manner, thereafter, each content identifier of the retrieved content identifiers can be provided, along with the share identifier, to an authentication service to determine whether the share identifier is currently authorized to view the underlying digital content associated with each respective content identifier. In this manner, the share identifier itself serves functionally the same purpose as a long-lived authentication token (e.g., JWT) that may otherwise be used to determine whether a particular user account is permitted to access the same content.

In accordance with a determination that the share identifier is authorized to view at least one content identifier (e.g., determining that permissions have not changed since public sharing was initially granted), the shared content renderer can be provided with content ids or the underlying content associated with each authorized content identifier and, in response, the shared content renderer can provide, as output, a reduced page suitable for sharing. In this manner, only approved shared content is served to the anonymous client device.

Embodiments described also include an event-driven cache that updates in response to specific changes in system state. In particular, the event-driven cache can serve to cache responses to both (1) authentication responses in respect of a particular share identifier; and (2) content output by the share content renderer. In this manner, the cache(s) can operate to quickly and efficiently serve responses to public URL requests without unnecessarily loading other backend systems.

For example, a first request for shared content having a share id can be received at a gateway. The gateway can query a cache service with the share id to determine whether a cache entry exists in respect of the share id. The cache may be configured, in some examples, to leverage one or more bloom filters as prefilters to determine whether the share id has been recently requested. The bloom filter(s) can provide a probabilistic output indicating a true negative or a possible positive.

In response to a true negative result from the bloom filter, the cache provides an output to the gateway indicating that the share id is not cached. In response to a possible positive, the cache can query an internal database (i.e., the cache content itself) with the share id as input (e.g., as a key in a key-value cache storage architecture). In other cases, in response to a possible positive from a first bloom filter, a second bloom filter can be queried. In some cases, the first bloom filter may be constructed from share ids that are currently authorized and the second bloom filter may be constructed from share ids for whom permissions have been revoked. In other cases, the first bloom filter may be a counting bloom filter (e.g., that can accommodate deletions). Many constructions are possible.

If querying the cache database results in a null output (or another similar indication that no result has been cached in respect of the share id), the cache can provide an output to the gateway indicating that the share id is not cached.

In response to receiving an output from the cache that the share id is not present in the cache, the gateway may be required to initiate an operation to determine (1) whether and which content ids are associated to the share id; and (2) whether the share id is permitted (as of the time of the request) by the authentication system to access each of the content ids identified. As noted above, this operation can be performed in whole or in part by the gateway. In some cases, the gateway queries a first service to obtain a list of content ids associated to the share id. In some embodiments, the gateway can be configured to query the same first service, or a second service, to obtain a list of content types associated with the share id.

If no content ids or types are returned as associated with the share id, the gateway may generate and send a response to the initiator of the request (i.e., the anonymous client device) denying access or otherwise indicating that the submitted share id is invalid. Alternatively, if the share id is valid and is associated with at least one content id, the gateway can thereafter submit the list of content ids together with the share id, to an authentication service to determine whether access is permitted. In this manner, as noted above, the share id itself functions as a long-lived authentication token.

As a result of this construction, architecture of the authentication service is unchanged; it functions in the same manner for authenticated users and anonymous users. For authenticated users, the authentication service receives a list of content ids and a user-specific long-lived authentication token. Based on this combination, the authentication service determines whether to permit access to the underlying digital content items associated with the content ids. Similarly, for anonymous requests, the authentication service receives a list of content ids and a share id as the authentication token. Based on this combination, the authentication service determines whether to permit access to the underlying digital content items. More simply, embodiments described herein simplify authentication operations by considering all persons that present a single share id as the same "user" of the platform, identified by the same share id.

Once the authentication service determines that the share id is permitted to access at least one of the content ids or content types presented, it provides a token to the gateway service that the gateway service can, in turn, provide to a database service in order to retrieve the digital content associated with each content id.

Thereafter, a shared content renderer can be leveraged to perform a custom rendering operation in respect of the content items returned from the database service. As noted above, the shared content renderer may adhere to a defined set of rules or configuration options that render content differently from secure content. In many embodiments, the shared content renderer can be configured to prevent/omit rendering of particular content types, may decorate rendered versions of certain content types differently (in respect of native secure content renderers), may strip functional affordances, and the like. Once the shared content renderer completes rendering of the content items associated with the content ids associated, in turn, to the single presented share id, the rendered content can be provided as output to the anonymous device that presented the share id in the first instance.

In addition, in response to a successful authentication of the share id, the gateway can be configured to cause the response from the authentication service and the response from the shared content rendered to be cached—separately or together—by the cache.

As a result of the caching, subsequent requests that present the same share id can be serviced significantly faster without burdening the authentication service or the database service.

For example, continuing the previous example, the gateway service may at a later time receive a request for the same share id from a different anonymous device. In this example, the gateway can execute operations to determine that a share id is present and that the share id is a valid share id. In this instance, the gateway may present the share id to the bloom filter which may return a possible positive match. Thereafter, the cache can be queried with the share id to obtain a cached authentication response from the authentication service and/or a cached rendered output from the shared content renderer. In the first instance, the cached authentication response can be presented to the database service output of which, as with the first request, can be provided as input to the shared content renderer. In the second instance, a cached output of the shared content renderer can be provided as output to the second anonymous device.

As noted above, embodiments described herein can leverage an event-driven architecture to determine when to expire items within a cache and/or when to rebuild a cache or a bloom filter gating request to the cache. For example, events in respect of changes to shared content can cause cached authentication responses to be instantly expired and/or cached output of the shared content renderer to be instantly expired. In a more simple phrasing, a shared content item can be retrieved from the cache until the underlying secure content is updated. As soon as underlying content is updated, the cached version can be marked as expired. Thereafter the next anonymous user to present an associated share id will cause the system to re-authenticate the share id, re-retrieve underlying content from the database service, re-render that content by operation of the shared content renderer, and re-store/replace expired content in the cache with the newly-rendered content. Similarly, any time a permissions change event occurs, caches can be cleared or updated.

In this manner, a system as described herein can serve, from a cache and not in a manner that pings backend systems (e.g., monoliths, database services, and the like), fresh shared content, in a manner respecting real-time permissions decisions, to any anonymous user that requests such content. Any change to underlying content or underlying permissions results in a refreshing of the cache.

In some further embodiments, web sockets or another similar real-time/open connection can be established with all anonymous end-users such that updates may be pushed to any user viewing shared content. Page refresh may not be required.

These foregoing examples are not exhaustive. The systems and techniques described herein are directed to a content collaboration platform or other type of digital content management system that allows users to create and publish digital content using a client application. However, the same or similar principles may be applied to other types of platforms or systems In particular, the systems and techniques described herein may be applicable to content collaboration platforms that use a web browser client application to generate content creation and editing interfaces for creating digital content and also content viewing interfaces for viewing the digital content. The systems and techniques described herein can be used to manage secure content generated using the content collaboration platform and provide controls to allow public access to secure content without some of the drawbacks of some traditional approaches.

As noted above, traditionally, content created and managed by a content collaboration platform is accessible only to authenticated users having an active account with the platform. This security scheme ensures that potentially confidential or proprietary information is only viewable by employees or associates of the company or organization. However, not all content managed by the content collaboration platform is confidential in nature and, in some cases, it may be beneficial to share select content with external parties or the public. For example, job postings, product press releases, product documentation, and other content may be developed as secure content but may be appropriate for public viewing when completed. One approach for sharing this information is to create and distribute static copies of the content via email or by hosting on a publicly available website. However, this approach may break the connection between the source (secure) content and the publicly available copy, resulting in either outdated material being publicly available or requiring manual operations to copy and repost any revised material.

The systems and techniques described herein are directed to a system that allows for public access to designated content items hosted by the content collaboration platform. Specifically, the content collaboration platform may include a hierarchical system of controls for managing public access to designated content items, which enables visibility and simple management of public access. As described herein, public access can be managed at the tenant level across multiple platforms, managed at the platform level across multiple content spaces or other product-specific domains, and managed at the content space level. The hierarchical control scheme allows individual users to control public access to individual content items while maintaining the ability to revoke public access across a broader range of content easily and quickly.

The systems and techniques described herein also include a content caching system that enables quick access to publicly available content while protecting the platform monolith from spikes in content demand, attacks to the platform, and other potential security and performance issues that can arise with public access. As described herein, the caching system may leverage content identifiers contained in the address used to access the public content, which may bypass existing authentication gateways and be used to quickly determine whether the requested content item is able to be resolved. The caching system may also intentionally delay or suppress delivery of content items if request criteria are not satisfied. For example, request criteria may specify a threshold number of times a content item can be accessed within a predetermined time period or for a particular session.

As described herein, the system may further prevent inadvertent exposure to confidential or proprietary content by preventing access to content within the content item that may extract or embed content from external content items. Specifically, content items that are made available to unauthenticated users may be generated without items that rely on macro instructions, include embedded content, or otherwise have content that extends beyond the current content item. Selectable graphical objects that include embedded or extracted content from other content items may be converted to a traditional hyperlink or other item that does not include embedded or extracted content. Other embedded objects may be replaced with placeholder objects that may be viewed by authenticated users, once authentication can be verified.

The term "content item" may be used to refer to a broad range of objects managed by the content collaboration platform including, for example, pages, documents, issues, tickets, blog posts, and other items that may be generated using the content collaboration platform and, in some cases, other platforms. As described herein, the terms page or document may be used to refer to digital content that is managed by the electronic document management system. The page or document may also be referred to as an electronic page or an electronic document and may include digital content that is typically generated by a system user (e.g., user-generated content). The digital content may include text entries, graphical objects, links, video clips, audio clips, embedded content, and other user-generated content. Each page or document may have a corresponding entry or element in a corresponding hierarchical element tree or page tree, which relates the page or document to other pages or documents within a particular content space also referred to herein as a document or page space. The system typically includes multiple document or page spaces, each space having one or more hierarchical element trees or page trees. Each space may also have a distinct permissions scheme defining a set of users having edit, view, and share access. Many of the examples provided herein are directed to systems in which the content items are electronic pages (or simply "pages"). The term "pages" can include a variety of content items including electronic documents, blog posts, product documentation, and other digital content provided by the content collaboration system. Additionally, the examples described herein can be extended to a variety of other content items including, for example, issues, tickets, electronic directory entries, and other digital content.

As described herein, content may be viewed and/or edited using a client application operating on a client device of the user. The client application may include a web browser or a dedicated client application, and may include a graphical user interface that enables viewing and editing user-generated pages or document content. The graphical user interface may enable document creation and document viewing from the same interface and may be toggled between a document view mode to a document edit mode in accordance with an authorized user having edit permissions for the document and/or the corresponding document space. As mentioned above, the user-generated pages or documents may be organized in accordance with a hierarchical element tree, also referred to herein as a document or page tree. The graphical user interface may include a navigation pane having an array of hierarchically arranged tree elements that can be used to visualize the hierarchical element tree or page tree. Each element may include a short summary, which may correspond to a document title or other metadata associated with the document and may be selectable to cause display of the corresponding content item in a content panel or pane of the graphical user interface.

These foregoing and other embodiments are discussed below with reference to FIGS. 1-10. The following examples are provided with respect to these figures for purposes of illustration and example and should not be construed as limiting the disclosure to the explicit examples depicted.

FIG. 1 depicts a simplified diagram of a system, as described herein. The system is depicted as implemented in a client-server architecture or client-service architecture, but it may be appreciated that this is merely one example and that other communications architectures are possible. In accordance with the examples provide herein, the system of FIG. 1 can be used to provide a series of interfaces to a document management system, page management system, content collaboration platform or other digital content management system via a computer network. Collectively, such systems can be referred to herein as "content collaboration systems."

The depicted architecture allows for remote access of digital content using either a dedicated client application (such as a web browser application, a mobile device application, or a native client application) to access backend servers, or a general purpose client application (such as a web browser application, a mobile device application, or a native client application) to access one or more web services offered by a backend system. As described herein, the system may be used to create, manage, and display content for electronic pages or documents.

The networked computer system or system of FIG. 1 depicts an example configuration in which multiple client devices may access a host server of a set of host servers via a computer network. The computer network may include a distributed network which may include local networks, gateways, and networking services provided by one or more internet service providers. The client devices are able to create, search, view and share content via the network either directly or through the various services provided by the host server of the set of host servers.

The client devices execute or operate respective example client applications, which may include a dedicated client-side application or may be a web browser client application. The client applications, may also be referred to herein as front end applications and may provide one or more graphical user interfaces for interfacing with the back end applications or services provided by the host server. The client devices typically include a display, processing unit, computer memory, and other hardware components.

The host server of the set of host servers may include multiple platform services, which may be part of a content collaboration platform. For example, the multiple platform services may include, but are not limited to, a content collaboration service, a recommendation engine service, a page or document creation and management service, content wiki services, messaging and event feed services, and other collaboration or data management services. A platform service of the multiple platform services may be implemented as one or more instances of the platform service executing on one or more host servers of the set of host servers. The multiple platform services may also provide different services including, for example, issue tracking services for creating, managing, and tracking issues for software development, bug tracking, and/or information technology service management (ITSM) services.

For embodiments described herein, a system includes a host server of a set of host servers, which may be a host of multiple platform services. The host sever, which may use one or more virtual or physical computing resources (collectively referred to in many cases as a "cloud platform"). In some cases, the set of host servers can be physically collocated or in other cases, each may be positioned in a geographically unique location.

The host server of the set of host servers can be communicably coupled to one or more client devices by a network. The host server of the set of servers hosts services and/or other server components or modules to support infrastructure for one or more backend applications, each of which may be associated with a particular software platform, such as a documentation platform or an issue tracking platform. For example, the host server may host a content collaboration service, an authentication/authorization service, a recommendation engine service, and other services. The host server may also include an event log module, and a user profile module. The host server may also have a local cache of pages of user-generated content.

The content collaboration service may provide an interface to client devices, and to the one or more backend applications, and/or software platforms, such as a documentation platform or an issue tracking platform. The client devices may be executing a frontend application that consumes services provided by the content collaboration service. Accordingly, a user of a client device may create, edit, search, and/or view electronic documents, pages, or digital content using the interface provided by the content collaboration service. By way of a non-limiting example, the interface provided by the content collaboration service may be web service based, such as a REST web service. The electronic documents, pages, or digital content may be transferred between a client device and a host server using one or more of JSON, XML, HTML, and/or a proprietary document format.

A content collaboration service as described herein allows the user to create, edit, search, and/or view electronic documents, pages, or digital content and may also be referred to herein as a document management system or page management system. The content collaboration service may allow the user to create, edit, search, and/or view electronic documents, pages, or digital content based on authentication and/or authorization of a user using the authentication/authorization service. The authentication/authorization service may authenticate a user based on user credentials, which may include a username or other user identification, password or PIN, biometric data, or other user-identifying information. The user credentials may be stored and tracked using a token, authentication cookie, or other similar data element.

Upon successful authentication/authorization of a user, the content collaboration service may access a user profile module to obtain a user profile associated with an authenticated user of a client device. The user profile associated with the user may suggest various permissions of a user for creating, editing, accessing, searching, and/or viewing various electronic documents, pages, or digital content.

The user profile associated with the user may also identify other details of the user, including but not limited to, a role of a user in an organization, one or more groups to which a user is a member, other users of the one or more groups to which the user is a member, one or more projects related to the user, one or more issues or tickets (managed by an issue tracking system) the user is assigned to, and so on.

The user profile may include, but is not limited to, user permission settings or profiles, and user history that may include user logs or event histories, system settings, administrator profile settings, content space settings, and other system profile data associated with the backend applications described herein and associated with the user.

Accordingly, the user of the client device may create, edit, access, search, and/or view electronic documents, pages, or digital content based on permissions granted to the user based on the retrieved user profile. The other services described herein may provide a user interface to other applications or services, for example, an issue tracking system, to create, edit, search, or view an issue or ticket on the issue tracking system. Thus, the content collaboration service may generate electronic documents, pages, or digital content which may also include data associated with one or more issues managed by the issue tracking system.

The system may also include one or more event log modules, which may track and/or store user actions, system events, or other data generated in accordance with activity performed by the system users. Specifically, the event log module may include navigation events that are generated in response to user selection or navigation to various pages, documents, or other content on the system. The navigation events may be used to determine which pages have been navigated to by a user either before or after a particular page or document.

In some cases, the navigation events are used to determine a set of pages or documents that have been navigated to or viewed by the user within a session or designated time frame. The user event log may also be used to store other properties of a session including, for example, average dwell time for a page or document, user interactions with content including likes, comments, and other feedback, other application use or other user activity observed during a session or time period. As described herein, data stored and tracked by the event logs may be used to determine a relatedness score or other measure of relevance for a card, tile, or respective content.

The host server may store electronic documents, pages, or digital content in a local database, memory, or cache. However, the host server may also store and/or access electronic documents, pages, or digital content in a remote database, memory, or cache (for example, in a cloud environment). By way of a non-limiting example, electronic documents, pages, or digital content stored in the local database, memory, or cache may be user-generated content, content space data, content tree data, content metadata and other digital content associated with the various backend applications described herein. The user-generated content may be stored as page objects, document objects, or other data elements.

As noted above, FIG. 1 depicts a system identified as the content collaboration system 100. The content collaboration system 100 includes a host server infrastructure 102 that can include one or more computing devices or servers configured to allocate resources (including processing resources, memory resources, networking resources and/or other resources) to one or more virtual machines or microservices to perform or coordinate tasks or operations associated with the content collaboration system 100.

Specifically, in many embodiments the host server infrastructure 102 can be configured to instantiate a backend application instance configured to communicably couple and/or provide API access in respect of one or more frontend application instances instantiated by one or more client devices. As noted above, a frontend application instance may be a web browser application and the backend application instance may be a server providing HTML responses to requests initiating from the browser application of HTTP or other similar protocols. This is merely one example; many architectures are possible.

The backend application instance can be configured to communicably couple to multiple client devices, such as requests from an client device 104 and requests from an anonymous client device 106. The client device 104 may be operated by an authenticated user of the content collaboration system 100 whereas the anonymous client device 106 may be operated by a user not authenticated by the content collaboration system 100.

The client device 104 can include a processor 104*a*, a memory 104*b*, and a display 104*c*. The processor 104*a* and the memory 104*b* can cooperate to instantiate a client application that renders a graphical user interface over the display 104*c*. The client application can be configured to solicit information from and provide information to a user of the client device 104.

The frontend application of the client device 104 is configured to communicably couple to a backend application instance instantiated by the host server infrastructure 102. In particular, the client application (also referred to as a "frontend application") can be configured to submit one or more requests to the backend application, including requests for shared content and secure content, as described above.

Specifically, the frontend application can be configured to initiate a request over HTTP to a gateway service 108 of the host server infrastructure 102. The gateway service 108 can be instantiated over dedicated hardware of the host server infrastructure 102 or may be instantiated over shared resources of the host server infrastructure 102, such as with the resource allocations 108*a*. The resource allocations 108*a* can include processing resources and memory resources that can cooperate to instantiate an instance of gateway/control software. Many configurations are possible.

Independent of hardware or software configuration, a request from the client device 104 is received at the gateway service 108. The gateway service 108 can first determine whether the request from the client device 104 contains a valid authentication token associated with an authenticated user of the content collaboration system 100. In particular, before the gateway service 108 accesses a platform backend 110 to retrieve secure or shared content, the gateway service 108 can be configured to access an authentication service 112 to determine whether the request received from the client device 104 is permitted. The platform backend 100 and/or the authentication service 112 can be instantiated over dedicated hardware of the host server infrastructure 102 or may be instantiated over shared resources of the host server infrastructure 102, such as with the resource allocations 110*a*, 112*a*, respectively. The resource allocations 110*a*, 112*a* can include processing resources and memory resources that can cooperate to instantiate an instance of gateway/control software.

In particular, a user of the client device 104 may provide credentials via the graphical user interface of the frontend application, rendered over the display 104*c*. The credentials (and/or an encrypted or salted version thereof) can be passed by the gateway service 108 to the authentication service 112 to determine whether digital content stored by the platform backend 110 (e.g., in a content database 114) should be returned to the client device 104. In response to determining that the provided credentials do appear in a permissions database 116, the authentication service 112 can generate a token and provide that token as an authentication token to the gateway service 108, which in turn may provide/forward the token back to the client device 104. Thereafter, the client device 104 can re-present the authentication token with future requests.

Specifically, in requesting secure content, the client device 104 can provide an address for the desired secure content along with a previously-received authentication token received from and/or generated by the authentication service 112. In response to receiving such a request, the gateway service 108 can query the authentication service 112 to determine validity of the authentication token and, upon determination by the authentication service 112 that the token is valid, the gateway service 108 can instruct the platform backend 110 to query the content database 114 for the requested content. The content database 114 can return the requested content to the gateway service 108 which in turn can provide the content to the client device 104 in response to the initial request. The client device 104 can thereafter leverage the display 104*c* to render the retrieved secure content.

In some cases, the gateway service 108 can be configured to access a gateway cache 118 in order to more quickly serve responses to the client device 104. As a result of this architecture, generally and broadly, an authenticated request for secure content 120 from the client device 104 can be initially received at the gateway service 108 which, in turn, can determine whether to service the request with input from the gateway cache 118, the platform backend 110, and/or the authentication service 112. In this manner, secure content stored by the platform backend 110 of the content collaboration system 100 can be provided to the client device 104. However, as noted above, if an unauthenticated device (such as the anonymous client device 106) were to submit an anonymous request for shared content 122, no credentials or tokens would be received by the gateway service 108. As a result, a conventional system may deny access to the anonymous client device 106.

For embodiments described herein, however, the gateway service 108 can be configured to determine whether the anonymous request for shared content 122 includes a share id, or rather whether the anonymous request for shared content 122 includes a string of characters that follow a format defined for share ids issued within the content collaboration system 100. For example, in some embodiments, a share id may be a hexadecimal number of a particular length. In other cases, a share id may be a base-64 number of a certain minimum length. In other cases, a share id may be a specification-compliant UUID.

In response to receiving the anonymous request for shared content 122, the gateway service 108 as noted above, can determine whether a share id exists in the request URL. In accordance with a determination by the gateway service 108 that the request URL of the anonymous request for shared content 122 does include a potentially valid share id, the gateway service 108 can thereafter retrieve from the platform backend 110 (or another service) a list of content ids associated with that share id, such as described above.

Once a list of content ids associated with a valid share id are obtained, the content ids along with the share id can be provided as input to the authentication service 112, which can access the permissions database 116 to determine whether the "token" (i.e., the share id) is permitted to access each of the provided content ids. In response to a positive determination that the share id is permitted to access the associated content ids, the authentication service 112 can generate a token for the gateway service 108 to access the platform backend 110 to retrieve the underlying content associated with the content ids. Thereafter, as noted above, the retrieved content can be rendered by a dedicated renderer of the platform backend 110 to strip certain content therefrom, before serving the reduced content to the gateway service 108 and in turn to the anonymous client device 106 for rendering in a graphical user interface of a display 106c controlled by cooperation of a processor 106a and a memory 106b, as described above.

These foregoing embodiments depicted in FIG. 1 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 2:
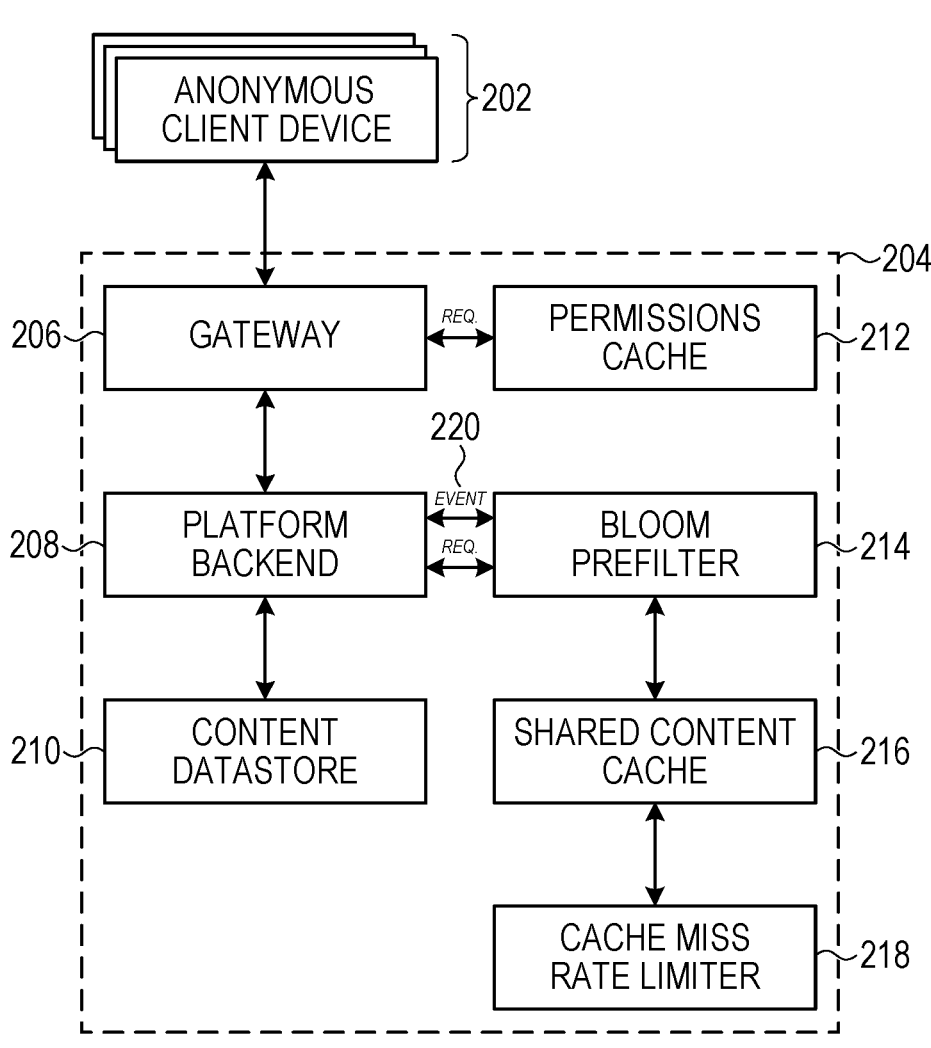
FIG. 2 depicts a simplified system diagram of a content collaboration platform serving shared content.

FIG. 2 depicts a simplified system diagram of a content collaboration system as described herein. As with other embodiments described herein, the system 200 can be configured to service requests for shared content from an otherwise authentication-protected content collaboration system.

In the illustrated embodiment, the system 200 is configured to receive anonymous requests from one or more anonymous devices, identified as the anonymous client devices 202. As with other embodiments described herein, a request from one or more of the anonymous client devices 202 can include a share id as an address/URL argument.

The system 200 includes a set of software instances, operably intercoupled. In particular, the system 200 includes the backend application instances 204, which in turn can include a gateway instance 206, a platform backend 208, a content datastore 210, a permissions cache 212, a bloom prefilter 214, and a shared content cache 216. The platform backend 208 may also be referred to herein as a platform instance or backend instance. Each software instance can be instantiated by operation of respective processing and memory resources, which may be hardware resources or may be virtualized resources provided by one or more physical hardware resources. It may be appreciated that many configurations are possible.

As with other embodiments described herein, a request from an anonymous client device of the anonymous client devices 202 can be received by the gateway instance 206 which can determine whether the requested address includes a share id. The share id can take any suitable form or format. In some embodiments, the gateway instance 206 is configured to detect a single share id format, whereas in others, the gateway instance 206 is configured to detect multiple share id formats.

Upon recognizing presence of a share id, the gateway instance 206 can check the permissions cache 212 to determine whether a permissions decision has been made in respect of the share id. In many circumstances, the share id may not be present in the permissions cache 212 and thus the permissions cache 212 may return a null result or other return signal to the gateway instance 206 indicating a cache miss.

If permissions are not cached by the permissions cache 212, the gateway 206 can communicate with the platform backend 208 to determine whether the detected share id is associated with one or more content ids, such as described above. If the platform backend 208 determines that the share id is invalid (e.g., that no content ids are associated therewith), the platform backend 208 can return a signal to the gateway instance 206 to cause the gateway instance 206 to deny access or to return a 404 error.

Alternatively if the platform backend 208 determines that the share id is associated with at least one content id, then a list, array, or other data structure including the matching content ids is returned to the gateway instance 206. The gateway instance 206 thereafter submits the share id and the content ids to a permissions and/or authentication service, such as described above in reference to FIG. 1. In response, if the share id is permitted to access the content ids, a token can be returned to the gateway instance 206 that can be provided to the platform backend 208 as permission to access the content datastore 210 to retrieve digital content associated with the content ids.

Once the content associated with the share id is retrieved form the content datastore 210, the platform backend 208 can leverage a shared content renderer such as described above. The shared content renderer may be configured to skip rendering of affordances and/or other decoration or functional elements. In addition, the shared content renderer can be configured to omit certain content based on content type or based on the content itself. For example, in some embodiments, a content id may be assigned to a remote media file such as a video. This content may be associated with a content type of "media." In response to identifying the content type, the shared content renderer of the platform backend 208 can strip the media from the shared page as rendered. Examples of other content types that may be prevented from being rendered or may be omitted include but are not limited to: media types; file downloads; links to other content; links configured for preview or thumbnail rendering; and the like.

Once the shared content renderer has rendered all content ids (e.g., paragraphs, titles, media, issues, boards, cards, and the like) associated with the share id, the rendered page can be provided as output to the gateway instance 206, which in turn can return the rendered page to the original requesting anonymous device among the anonymous client devices 202.

In addition, the gateway instance 206 and/or the platform backend 208 can be configured to store the permissions decision of the authentication system in respect of the share id within the permissions cache 212. Further, the gateway instance 206 can be configured to store the rendered content—rendered by the shared content renderer—in the shared content cache 216. In many cases, as noted above, the shared content (and/or the permissions) can be inserted first into a bloom filter stored by and/or accessible to the bloom prefilter 214. As may be appreciated the bloom prefilter 214 can improve performance of future cache requests. After insertion into the bloom prefilter 214, the rendered content can be stored in the shared content cache 216. As a result of this construction, future requests presenting the same share id can be serviced by operation of the permissions cache 212, the bloom prefilter 214, and the shared content cache 216 without tolling or taxing the platform backend 208 itself.

In addition, in some embodiments, the backend application instances 204 includes a cache miss rate limiter 218 configured to monitor how many times the bloom prefilter 214 and/or the shared content cache 216 miss a cache hit for one or more share ids. Specifically, the cache miss rate limiter 218 can instruct the gateway instance 206 to only return results from caches if a cache miss rate exceeds a threshold. This configuration of the cache miss rate limiter 218 can ensure that enumeration attempts or random probing of the backend application instances 204 will not inadvertently return a content from the content datastore 210. The cache miss rate limiter 218 can monitor absolute count of cache misses, proportion of cache misses to hits, cache misses per hour or minute, or any other statistic related cache misses.

In addition, as noted above, the backend application instances 204 and in particular the caches of the backend application instances 204 can be configured to update in response to various events generated by the system. For example, as noted above a valid share id can cause to be cached a permissions decision (and/or a corresponding token), and a rendered version of content associated with that share id. If underlying content associated with that share id is changed, however, a content change notification may be generated or observed by the platform backend 208, which in turn can generate an event 220 to cause the bloom prefilter 214 and/or the shared content cache 216 to delete or remove any entries related to content ids that identify the changed content, thereby rendering previously-generated permissions decisions (i.e., tokens) invalid. As a result, subsequent requests for the same share id will be required to re-assess permissions in respect of all content ids, re-retrieve underlying content associated with those content ids, and re-generate/re-render content as described above.

These foregoing embodiments depicted in FIG. 2 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof. Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 3:
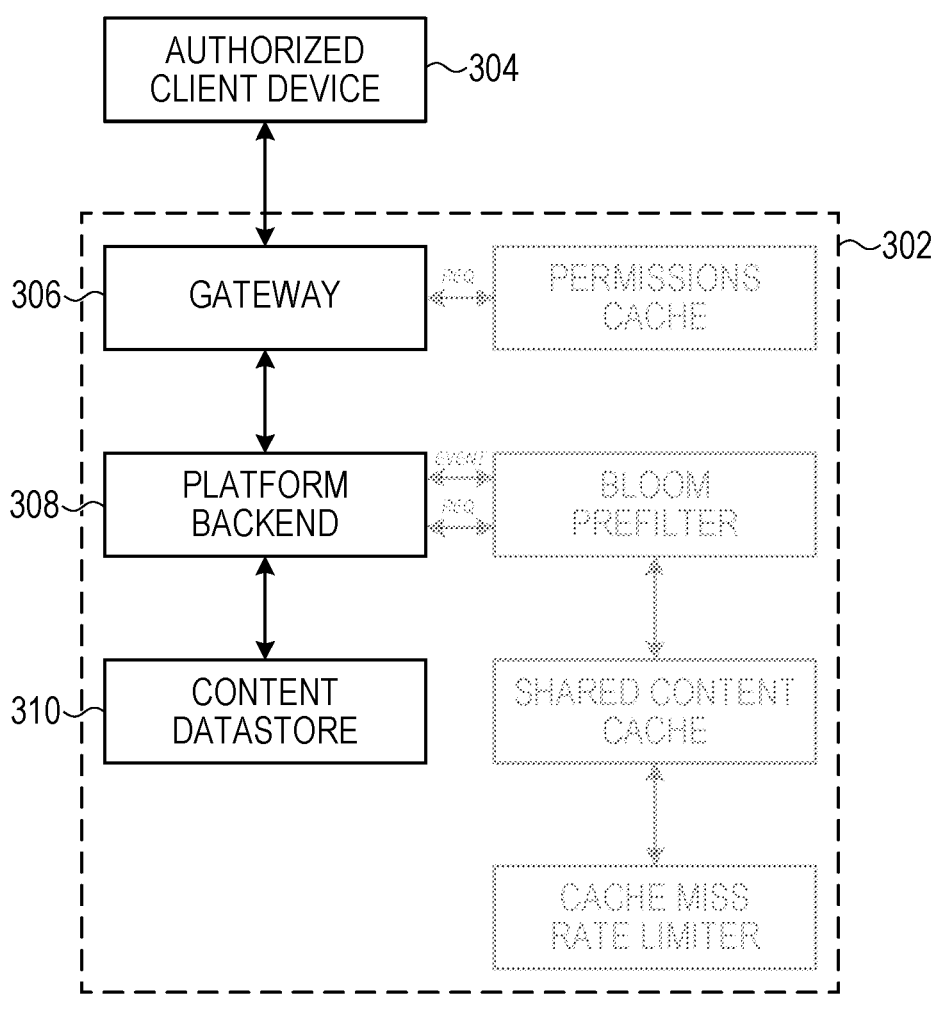
FIG. 3 depicts a simplified system diagram of a content collaboration system serving secure content.

For example, it may be appreciated that a system as described herein can entirely ignore caches related to public content and/or shared content while servicing requests from authenticated users. In particular. FIG. 3 depicts a system 300 similar to the system of FIG. 2 in which a set of backend application instances 302 can receive one or more requests form an authorized client device 304, having been authenticated to a permissions and/or authentication service of the system 300. In response to receiving this request, a gateway instance 306 can forward the request—together with the supplied token previously obtained from an authentication service—to a platform backend 308 which in turn can retrieve a current state of associated content items from the content datastore 310.

These foregoing embodiments depicted in FIGS. 2-3 and the various alternatives thereof and variations thereto are presented, generally, for purposes of explanation, and to facilitate an understanding of various configurations and constructions of a system configured for serving shared content and secure content alike, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 4:
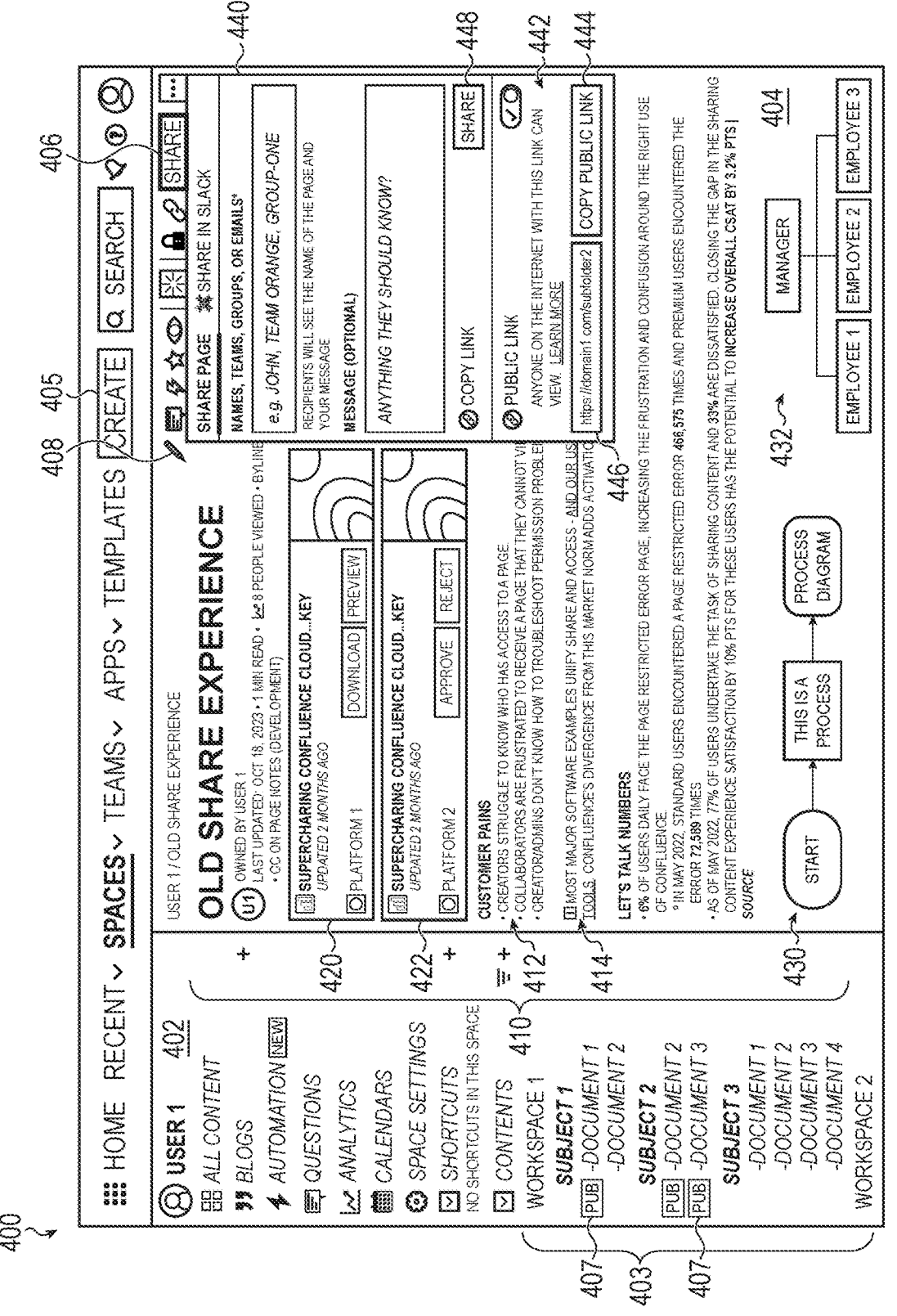
FIG. 4 depicts an example graphical user interface having a controls for enabling public access or non-authenticated user access to an example content item managed by a content collaboration platform.

FIG. 4 depicts an example view of a graphical user interface or a frontend application executing on a client device of a user. In particular, FIG. 4 depicts an example graphical user interface 400 having controls for enabling public access or unauthenticated user access to an example content item which, in this case, is a page having user-generated content 410 displayed in a content panel 404 of the graphical user interface. In accordance with the examples described herein, the graphical user interface 400 may be displayed subsequent to or in response to an authentication of a user of the content collaboration platform. The graphical user interface 400 of FIG. 4 is an illustrated comparison of the same page displayed in a publicly viewable form in graphical user interface 500 of FIG. 5.

Generally, the graphical user interface 400 provided by the frontend or client application may operate in one of a number of different modes. In a first mode, a user may create, edit or modify page or other digital content. This mode or state of the graphical user interface may be referred to as an editor user interface, content-edit user interface, a page-edit user interface, or document-edit user interface. The first mode may be initiated or invoked in response to a user selection of the edit control 408. In a second or other mode, the user may view, search, comment on, or share the electronic document, page, or digital content. This mode or state of the graphical user interface may be referred to as a viewer user interface, content-view user interface, a page-view user interface, or document-view user interface. The graphical user interface may be implemented in a web browser client application using HTML, JavaScript, or other web-enabled protocol.

The graphical user interface 400 may allow the user to create, edit, or otherwise modify user-generated content that is stored as an electronic page. The electronic page or other digital content may be rendered on a client device by the content collaboration service upon authorization/authentication of the user by the authentication/authorization service, and based on permissions granted to the user as validated according to a user profile associated with the user. Further, the content that is rendered in the content panel, including embedded content 430, 432 and the selectable graphical objects 420, 422, which may contain content extracted from or obtained from other content items having their own respective permissions profiles.

In one example, the graphical user interface 400 may have various panels, partitions, sections, or panels displaying different content. For example, the graphical user interface 400 includes a navigational panel 402, a toolbar 405, and a content panel 404. The navigation panel 402 displays a hierarchical element tree 403 also referred to herein as a page tree. The hierarchical element tree 403 includes a hierarchically arranged set of elements, each element selectable to cause display of a respective content item in the content panel 404. The elements may include a short title and/or graphical elements that indicate the subject matter and type of content item associated with each respective element. Many of the elements may also be selected and moved within the hierarchical element tree 403 in order to redefine a parent-child relationship between the respective elements. As shown in the current example, the hierarchical element tree 403 may also include indicia 407, which designate which pages or content items are publicly available. The indicia 407 allows an authenticated user to visualize at a glance what content is available for public viewing and what content may remain behind an authentication firewall or security scheme. The collection of elements depicted in the navigational panel 402 may be associated with a respective space, also referred to herein as a content space, page space, or document space. As discussed previously, a space defines a collection of content items for which the space creator is the default administrator having default read, write, view, and control permissions with respect to all items within the space.

Generally, the graphical user interface 400 is used to generated and display user-generated content 410. As shown in FIG. 4, the user-generated content includes text content 412, which may be formatted in accordance with a formatting scheme, such as HTML, XML, Atlassian Document Format (ADF), or other similar scheme or language. In the present example, the text content is also displayed in line with hypertext 414, graphical elements and other content that is enabled by the editor instantiated by the frontend application within the content panel 404.

The user-generated content also includes other elements that may be generated by respective sets of macro instructions that are associated with the page. Example macro-enabled content include the selectable graphical objects 420, 422, which include embedded content extracted from respective target content items that are linked to the objects 420, 422. For example, the selectable graphical objects 420, 422 may include an extracted title, brief description embedded graphics, and other content extracted from the respective content item. The selectable graphical objects 420, 422 may also include selectable elements or virtual buttons that allow the user to modify the target content item directly from the selectable graphical objects 420, 422. The selectable graphical objects 420, 422 may also include graphics indicating the type of content that is linked and the respective platform that is hosting the content.

Other macro-enabled content includes embedded content 430, 432, which includes graphics (e.g., diagrams, charts, or other graphics) that are extracted from another content item. In some cases, the embedded content 430, 432 are extracted from content items provided by a separate platform and are updated in response to a page refresh or load operation. Other macro-enabled content may include in-line comments, embedded viewports such as iframe elements, tables generated using linked content, and other similar items. As stated above, the system may reconcile an authenticated user's permissions with permissions profiles for each of the embedded or macro-enabled content of the page before rendering the respective items. This prevents disclosure of potentially sensitive content to users that do not have the appropriate access or permissions.

As described herein, embedded or macro-enabled content may be removed or suppressed from display when the page is viewed by an unauthenticated user or otherwise publicly available. For example, as shown in the graphical user interface 500 of FIG. 5, the selectable graphical objects are replaced with standard hyperlinks 520, 522 and the embedded graphical items 530, 532 may be replaced with a placeholder element, thereby preventing an inadvertent disclosure of potentially sensitive or confidential content. As described herein, in some cases, a macro-free or embedded-content-free version of the page may be stored or served to unauthenticated users. In some cases, the public version of the page may be cached or stored in a separate data store that is separate from a data store of the monolith of the content collaboration platform.

Returning to FIG. 4, a user may control public access to the page by accessing the control panel 440 (also referred to as a floating window element) by selecting a corresponding control 406 of the toolbar 405. As shown in the example control panel 440, the user may toggle public access using control 442. In response to a use selection of the control 442, the system may generate a public address that is unique to the page. As described herein, the new address may include multiple portions that may be used by the system to access a public version of the page. For example, the new address may include a first domain portion that indicates that the address references a publicly available content item. The first domain portion may include a predefined text string that defines a root or primary domain and, optionally, one or more subdomains that the system is able to interpret as a public link. The new address may also include a second domain portion that includes an external content identifier that can be linked to an internal or shared content identifier of the page. As described in more detail below with respect to FIGS. 7A and 7B, the new address can be used to serve publicly viewable pages to unauthenticated users. An example view of the publicly viewable page is depicted in the graphical user interface 500 of FIG. 5. In the current example control panel 440 of FIG. 4, the new address may be displayed in region 446 and may be copied using control 444.

Figure 5:
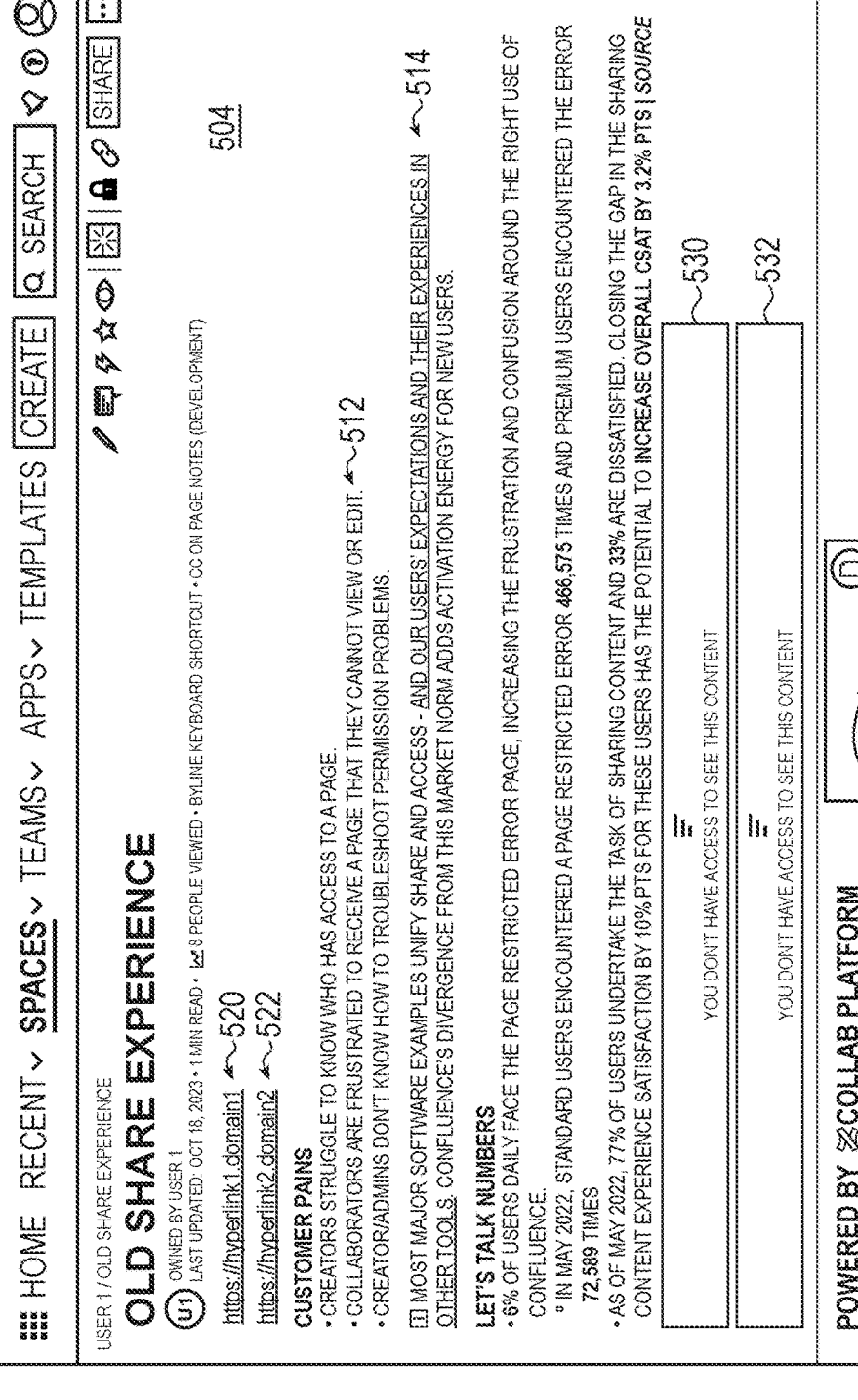
FIG. 5 depicts an example graphical user interface rendering a shared content item.

The system may maintain both the new (public) address and the original (secure) address for accessing the content item. Specifically, the original (secure) address may be used to access the full version of the content item, as depicted in FIG. 4, subsequent to a licensed user being authenticated by the system. The public address can be shared externally and may be used to view a public version of the content item in response to a request for the public item, as depicted in FIG. 5. This allows the traditional internal system to operate as expected for licensed users and prevents exposing internal IDs or addresses from being shared externally.

With reference to the control panel 440 of FIG. 4, before the control 442 may be enabled or before the page may be made publicly available, the system may need to resolve a hierarchical permission scheme in which multiple levels of control must allow for public sharing of content for the specific page, for the respective space, at a respective site or platform level, and for a particular tenant or cross-platform level. A more detailed description of an example hierarchical control scheme is described in more detail below with respect to FIG. 8. In some implementations, in accordance with one or more of the levels prohibiting or restricting public access, the control 442 may be grayed out or inoperable. In some implementations, operation of the control 442 not permitted by one or more levels of the control scheme may cause display of an informational window with a brief description indicating which level of control is prohibiting public sharing of the page and a brief explanation of why content may not be shared publicly.

The control panel 440 may also include other controls and options for sharing the page with other authenticated users. For example, the user may enter user names, teams, or other platform entities in region 440, which will receive a link or invitation to view the page in response to a user selection of the share control 448. Users may also optionally enter message text to be transmitted with the link or invitation. Recipients of a shared link or invitation will be able to view an internal version of the page similar to or the same as shown in the graphical user interface 400 of FIG. 4 as long as they have at least the same or more expansive permissions as the current authenticated user. As mentioned above, respective permissions of each embedded or macro-enabled content item may be resolved with respect to any authenticated user before being viewed.

In response to a designation that a content item is publicly available, the collaboration platform may indicate which pages may be available to unauthenticated users. For example, within the content panel 404, the collaboration platform may display a graphical element and/or text that indicates that the page or document is publicly available. For example, an icon or banner including the text "page is publicly viewable" may appear in the graphical user interface 400. Additionally, elements of the hierarchical element tree 403 which are publicly available may also be marked or accompanied with an icon or banner that indicates which content items are publicly available. For example, a small box including the word "public" may appear near respective elements in the hierarchical element tree 403 that are accessible by unauthenticated users.

FIG. 5 depicts an example graphical user interface 500 of a public version of the page depicted in FIG. 4, discussed above. The public version of the page may be displayed in a content region 504 and include corresponding user generated content 510 including textual content 512, in-line hyperlinks 514, and other graphical elements and icons. The formatting and arrangement of the content may also be largely preserved from the internal or authenticated view of the page. However, there are some differences in the content when viewed by an unauthorized user. For example, the navigational panel and hierarchical element tree are suppressed from display to prevent revealing other content items that may not be publicly accessible. Alternatively, a limited navigational panel having only publicly available content items may be displayed in the graphical user interface 500 including the public version of the page. For example, a limited or publicly viewable hierarchical element tree may only include elements that have been designated for public access (e.g., items shown with indicia 407 as shown in FIG. The page may also include additional banner content including promotional materials 540 for the collaboration platform or for other platforms or services. The promotional materials 540 may include graphical elements that are inserted into the content for the publicly viewable version of the page. Further, as discussed previously, embedded or macro-enabled content may be suppressed from display or otherwise omitted from the user-generated content 510 of the public version of the page. Specifically, the page in this example is displayed without the selectable graphical objects (e.g., 420, 422 of FIG. 4) and without the embedded content items (e.g., 430, 432 of FIG. 4). Other macro-enabled or embedded content may also be suppressed from display or otherwise omitted from the publicly viewable page. In the present example, the selectable graphical objects are replaced by text-based hyperlinks 512, 514 free of embedded content or graphics. The embedded graphical items are replaced with placeholder blocks or items 530, 532.

Figure 6:
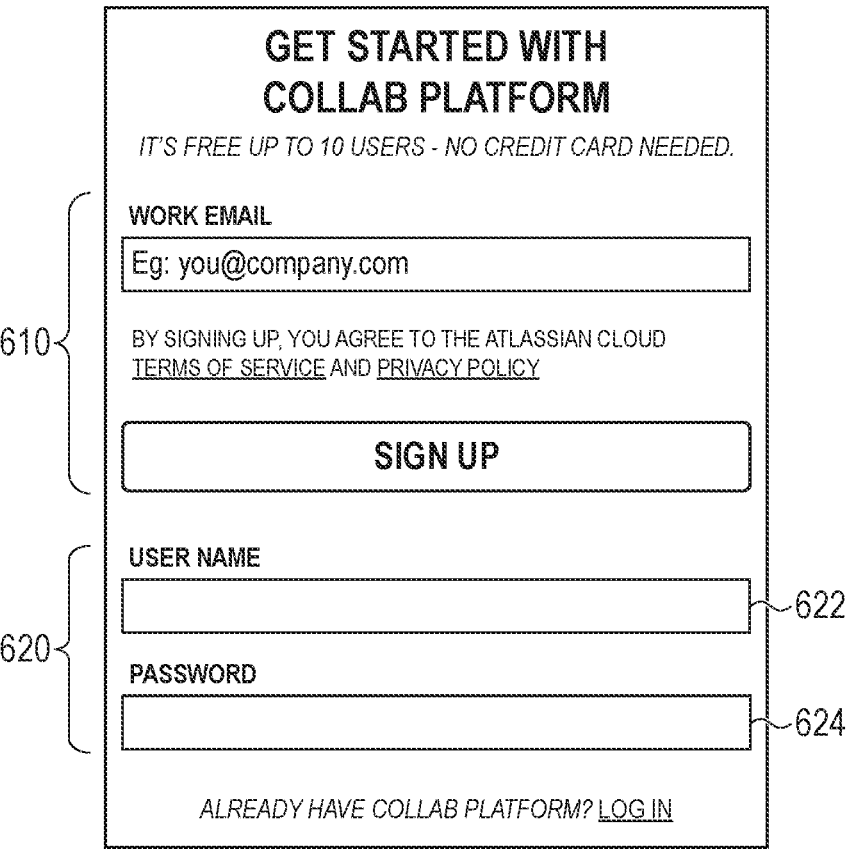
FIG. 6 depicts an example graphical user interface for receiving authentication credentials or joining a content collaboration platform.

In response to a user selection of one of the placeholder blocks 530, 532, the user may be redirected to a content access portal or a content access window may be displayed. An example content access portal 600 is depicted in FIG. 6. In the present example, the content access portal includes controls and regions 610 that can be used to add the unauthenticated user to the content collaboration platform. Additionally, the content access portal includes controls and regions 620 that can be used to authenticate the user including a username region 622 and a password region 624. Other controls for authenticating the user include controls for implementing a single sign on or a trusted platform authentication scheme may also be used. In response to a successful authentication of the user and in accordance with the authenticated user having corresponding access to the respective content, the view may be redirected back to the graphical user interface 500 and the placeholder blocks 530, 532 may be replaced by the corresponding embedded content items (e.g., 430, 432 of FIG. 4). In some instances, in response to a successful authentication, the user may be redirected to the internal or authenticated graphical user interface 400 of FIG. 4

Figure 7A:
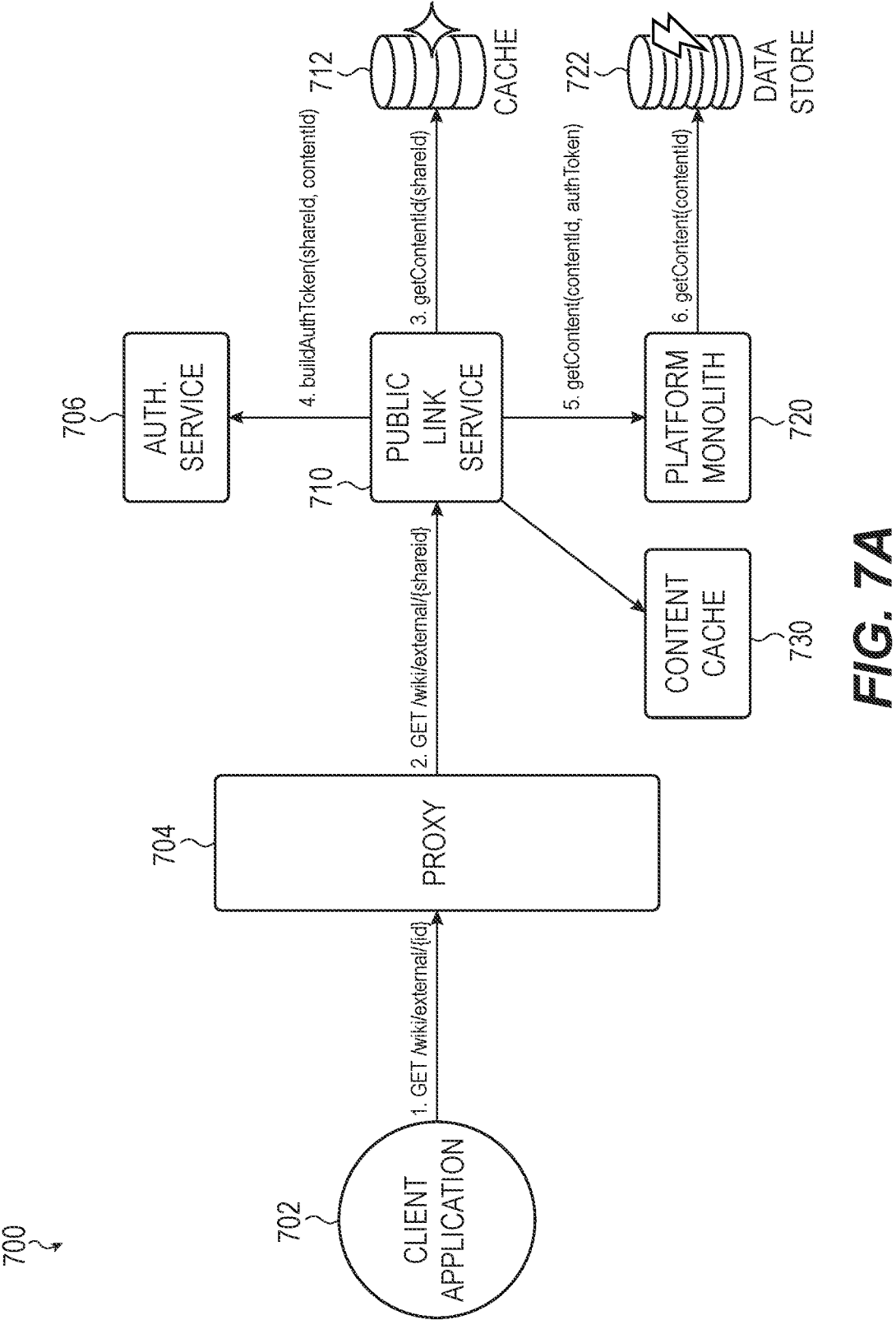
FIGS. 7A-7B depict example systems for managing and serving both secure content for authenticated users and publicly available content for unauthenticated users.

FIG. 7A depicts an example system for managing and serving both secure content for authenticated users and publicly available for unauthenticated users. Specifically, FIG. 7A depicts a system 700 that includes access to content items either through a data store 722 of the platform monolith 720 or through a content cache 730 provided by the public link service 710. This system may allow for improved performance when delivering publicly accessible content while also providing various security and protective features that can be used to protect the platform monolith 720 for use by authenticated users.

As shown in FIG. 7A, the system 700 may be accessed by a client application 702, which may be a web browser or, in some instances, a dedicated client application. For purposes of this example, the client application 702 is a browser that is able to obtain and display web-enabled content located at a designated address. The designated address may be a URL entered into the address field of the client application 702 or associated with a link selected by a user of the client application 702.

As described previously, when a secure content item is converted to a public page or otherwise enabled for public access, a new public address may be generated or formulated. In some implementations, the public address includes multiple domain portions that may be used by the system 700 for various purposes. The address may include a URL, which may include a main domain and multiple subdomains, which may be used by the system 700 to service the request. For example, the public address may include a first domain portion, which identifies the address as belonging to a public content item and a second domain portion, which includes or corresponds to a content identifier or content ID of the particular content item being requested. The first domain portion may include, for example, a predefined string of characters that are associated with content items that, at some time, have been designated for public access. In this example, the first domain portion includes the string "/wiki/external." However, the specific domain text and number of subdomains that are used may change depending on the implementation and platform. The second domain portion may include a unique identifier that can be used to identify the original (secure) content item. This portion may be referred to herein as an external content ID, shared content ID, shareID, or public ID and is typically unique with respect to the first domain portion to ensure that the content ID does not map to another content item managed by the system 700.

In the example of FIG. 7A, a publicly accessible content item may be requested by the client application 702, which is received by the proxy 704. The proxy 704 analyzes the request and, based on the first domain portion, may determine that the request is for a public content item (rather than a secure content item). In response to a determination that the request is for a public content item, the proxy 704 may forward the request to the public link service 710. Alternatively, in response to a determination that the request is for a non-public or secure content item, the request may be forwarded to an authentication service 706 or other authenticating gateway for verifying the credentials or other authentication data of the user request before providing access to secure content items of the platform monolith 720 (or other aspects of the system).

For requests that include a first domain portion that is identified as being a public content item, the public link service 710 uses the second domain portion to identify or extract an internal content ID, which may also be referred to herein as a content ID or ContentID. In some implementations, the public link service 710 uses the external ID (shareID) received in the second domain portion to look up the internal content ID in the cache 712. If the external ID does not resolve to a valid internal content ID using the cache 712, the public link service 710 may query the platform monolith 720 or other aspects of the system. An unresolved request may result in an error being transmitted to the client application 702.

The public link service 710 may then use the external ID (shareID) and the internal content ID (contentID) to obtain authorization to access the content using the authorization service 706. For example, the authorization service 706 may resolve a public-status permission profile associated with the internal content ID and/or the external ID, which is based on a hierarchical permission scheme maintained by the system. An example hierarchical permission scheme is described in more detail below with respect to FIG. 8. In some cases, the authorization service 706 stores a token or other data element representing a current public status condition that is based on an evaluation of multiple permission levels. The data element may include an array or set of current permission conditions that convey a current state of the hierarchical permission scheme. The data element, token, or other representation of the current public status condition may be hashed and/or signed. In response to the authorization service 706 obtaining a valid public-status condition indicating that public access is currently granted, an access token may be issued, which is used by the public link service 710 to access content at the data store 722 of the platform monolith 720 or in a separate page cache 730.

In one implementation, the public link service 710 checks for a cached version of the content item in a content cache 730 (also referred to as a page cache) of the content collaboration platform. In some implementations, the cached version of the content item includes text content and other non-linked or non-embedded content and does not include embedded objects, content extracted from other content items, or content generated using macro instruction sets associated with the corresponding secure content item. In other cases, the cached version of the content item includes embedded objects, content extracted from other content items, or content generated using macro instruction sets associated with the corresponding secure content item but in processing the cached page, those items are not rendered or are otherwise suppressed from display.

In this example, public link service 710 accesses the content cache 730 using the authentication token generated by the authentication service 706 and based on the external content ID and internal content ID. In response to the public link service 710 being able to resolve the content ID with a cached version of the content being stored in the content cache 730, the public link service 710 may retrieve at least a portion of the user-generated content from the content cache 730. In response to the cached version of the page being absent from the content cache 730, the public link service 710 may retrieve the portion of the user-generated content from a data store 722 accessible through the platform monolith 720. In this example, public link service 710 accesses the platform monolith 720 using the authentication token generated by the authentication service 706 and based on the external content ID and internal content ID. If the content item is identified and successfully retrieved by the monolith 720, the public link service 710 or other service may cause a cached version of the content item to be stored in the content cache 712.

The content cache 730 may be used to protect the monolith 720 from peaks in content demand caused by a sudden increase in the exposure caused by public pages. The content cache 730 may manage initial content requests and may use request criteria or rules to regulate the service without creating a substantial burden on the monolith 720. The public link service 710 may also manage the updating and synchronization of the cache 730 asynchronously in order to reduce or level the demand on the monolith 720 during high demand. The request criteria may define a number of times that a respective page can be requested within a predetermined time period. In response to a particular page being requested a number of times exceeding a request threshold, within the predetermine time period, access may be denied to the particular page until a timeout or reset period has elapsed.

The public link service 710 may also intentionally delay the service of content in response to the request criteria being exceeded. This may reduce the load on the overall system 700 and may protect the monolith 720 from high frequency content requests that may affect performance of authenticated or licensed system users. The public link service 710 may, in response to a criteria being satisfied or exceeded, restrict requests to only those that can be serviced by the content cache 730 and requests that cannot be serviced by the content cache 730 may be denied.

In some implementations, the public link service 710 causes failures to resolve or invalidate content IDs in the cache 730 in order to reduce the burden of attempting to resolve invalid content IDs ("no-hit" requests) and improve performance of the system. However, the public link service 710 may also protect against frequent "no hit" attempts by either not caching invalid requests entirely or temporarily suppressing the caching of invalid requests to preserve the operation of the content cache 730 for valid requests and normal operation.

Figure 7B:
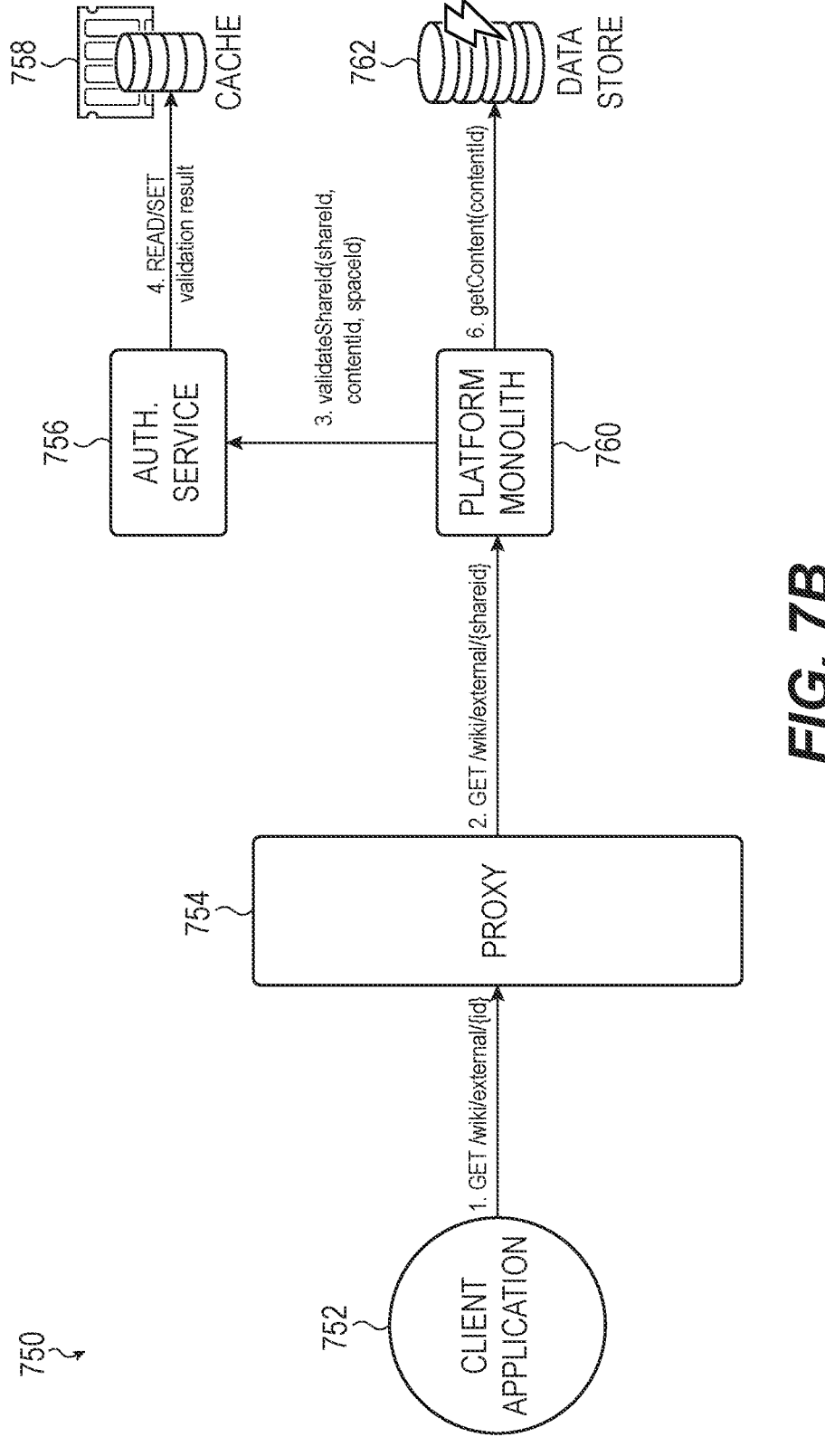

FIG. 7B depicts an alternative system 750 for providing content items designated for public access. The system 750 may be accessed by a client application 752, which may be a web browser or, in some instances, a dedicated client application. Similar to the previous example, the client application 752 is a browser that is able to obtain and display web-enabled content located at a designated address. The designated address may be a URL entered into the address field of the client application 752 or associated with a link selected by a user of the client application 752. Also, just like the previous example, the designated address may include a first domain portion that indicates that the content may be publicly accessible and a second portion that includes an external content ID or other ID that be mapped to an internal content ID of the system 750.

Similar to the previous example, the proxy 754 or gateway may determine that the request is directed to a public page and, as a result, forward the request to platform monolith 760. If the request is not directed to a public page because the address does not include the first domain portion, the request may be directed to the normal authentication flow for licensed users. In the example of FIG. 7B, the platform monolith 760 attempts to resolve the externalID (shareID) with an internal content ID. In addition, if the internal content ID exists, the monolith 760 may also resolve a space ID (spaceID), to which the content ID belongs. The monolith or an associated service thereof may request authentication or approval for public access of the content by passing the external ID, the internal ID and space ID to the authorization service 756. The authorization service 756 may access a cache 758 which may include data regarding a public-status permission profile associated with the content item. As discussed previously, the public-status permission profile may be represented by a token or other data element representing a current public status condition that is based on an evaluation of multiple permission levels. The data element may include an array or set of current permission conditions that convey a current state of the hierarchical permission scheme. The data element, token, or other representation of the current public status condition may be hashed and/or signed. The cache 758 may store and index these data elements or tokens by the content or space IDs for efficient access. The cache 758 may also be refreshed in response to one or more platform events that are predicted to cause a change in the public-status permission profile. Generally, the platform may generate events in response to user interactions with content or in response to other system activity. Events that are predicted to cause a change in the permissions of a content item may include, without limitation, movement of a content item from a first content space to a second content space, a change in ownership of the content with respect to one or more system users; an express interaction with the content permission controls or any other change to one or more of the permission levels associated with the public-status permission profile.

In response to the authorization service 756 returning a valid permission condition indicating that public access is granted with respect to the content item, the platform monolith 760 may obtain and render a public version of the content item from the data store 762. As discussed previously, the public version of the content item may omit or suppress linked content, embedded content, macro enabled content, and other content that is associated with content items that may not have public access granted. The content (user-generated content) is then displayed on the client application 752. In some implementations, the data store 762 is a mirrored copy of a primary or live data store used for licensed use. This may protect the primary or live data store from performance degradation due to high-public demand or other additional loads caused by public access. Also, similar to the previous example of FIG. 7A, a content cache system may be implemented and maintained in order to protect other aspects of the system from increased demand caused by public access.

While the examples of FIGS. 7A and 7B depict specific arrangements of system components, aspects of the two examples may be combined, depending on the implementation. For example, the system 700 of FIG. 7A may include a permissions cache 758, as shown in the system 750 of FIG. 7B. Further, the system 750 of FIG. 7B may include a public link service 710 and/or content cache 730 as shown in the system 700 of FIG. 7A. Other modifications and combinations may also be used in view of the other examples and explanations provided herein.

Figure 8:
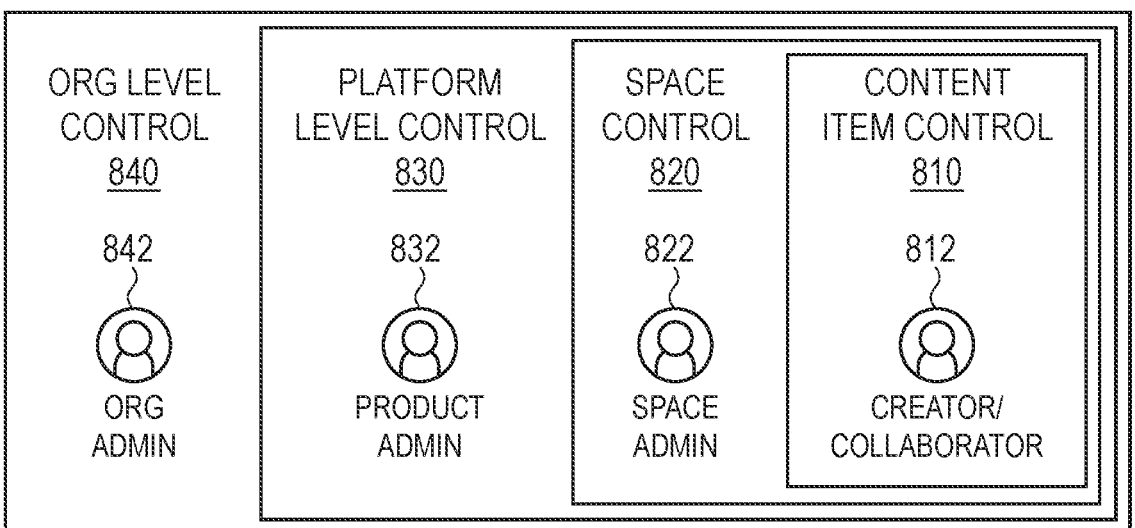
FIG. 8 depicts an example schematic diagram of a control scheme for public access to content for unauthenticated users.

FIG. 8 depicts an example schematic diagram of the control scheme for public access to content for unauthenticated users. Specifically, FIG. 8 depicts an example system 800 which provides hierarchical control of access to public content items. Specifically, as shown in FIG. 8, the system 800 may enable toggle and/or content item specific control at a variety of hierarchical levels for a given company or enterprise. Each of these levels of control can be used to enable or disable page level control 810, which may be performed by the content creator 812 and/or another authenticated user having at least write/publish permissions with respect to the particular page. Together, this composite permissions scheme may be referred to herein as a public-status permissions profile or simply a composite permissions profile. As described with respect to the examples, above, the content item level or page-level control 810 may be performed using a respective control or affordance provided in the client application. The respective control or affordance at the content item level control 810 may be disabled if any of the other control levels of the system 800 are set to prohibit public access.

As shown in FIG. 8, a space-level control 820 may be used to toggle public access for content items with a particular content space (e.g., a page or document space). As described herein, a content space includes a set of content items that have been created within or move to a common workspace having the space creator as the default administrator 822. In some instances, a space may be associated with a team rather than a specific user and one or more of the team members may be granted administration permissions by default. Space administration rights provide the space administrator 822 the permission to change read, write, view, and other permissions with respect to all content items associated with the space. The space administrator rights also provide the space administrator 822 the permission to grant similar permissions to other system users, as consistent with settings and permissions granted by higher-level permission controls (e.g., product-level controls and/or organization-level controls). In the current example, the space administrator 822 may visualize the current public-access settings of each content item within the respective space using a graphical user interface similar to the examples provided herein including the example of FIGS. 4, 9A, and 9B. Space administrator 822 may also selectively disable public accessibility for individual content items using individual controls (e.g., radio or checkbox controls) or may toggle a public accessibility setting on or off for all of the content items within the space using a single control. The settings designated by the space administrator 822 for the space-level control 820 may be stored in a permissions profile of the respective space.

Similarly, public accessibility may be controlled for the entire platform at a platform-level control 830 operated by a platform administrator 832. In this example, the term "platform-level controls" may also be used to refer to other intermediate-level controls including site-level controls, group-level controls, or other intermediate levels of control. The platform-level control 830 may enable visualization of the public access settings of each space and/or each content item hosted by the platform. In some implementations, the public access settings may be visualized using a graphical user interface similar to the examples described herein with respect to FIG. 9A. Specifically, the platform administrator may visualize public access settings at a space-level of visualization, which may be expanded to provide content-level visualization for a respective space. The platform administrator 832 may selectively disable public accessibility for individual content items or individual spaces using individual controls (e.g., radio or checkbox controls) or may toggle a public accessibility setting on or off for all of the spaces and corresponding content items using a single control. The settings designated by the platform administrator 832 for the platform-level control 830 may be stored in a permissions profile of the respective platform.

In some implementations, the platform or product administrator 832 may preemptively disable public accessibility across a platform, which disables any lower level control of public access (e.g., by space administrator 822 or creator 812). Thus, if and when the platform or product administrator 832 does allow public accessibility under this scheme, no pages will be publicly available until designated by a lower level control (e.g., space-level control 820 or content item control 810). Once the platform administrator 832 has allowed public accessibility controls to be enabled and space administrator 822 or content creators 812 have exercised control and allowed public access to spaces or content items, those settings may be preserved if the platform administrator 822 later disables public accessibility. Thus, a subsequent toggling action by the platform administrator 822 turning public access off and then on again will not reset the individual settings of respective space controls 820 and content item controls 810. Alternatively, in a different implementation, a toggling operation may reset all of the space-level controls 820 and content item controls 810 to disable public access.

Also as shown in FIG. 8, organization-level controls 840 may allow for cross-platform public access control across multiple platforms and their associated content items. The organization-level controls 840 may also be referred to herein as tenant-level controls. The organizational administrator 842 (or tenant administrator) may visualize and control public access setting across different products or platforms using a similar interface. Depending on the compatibility of the various platforms, the control may be provided within one of the plurality of platforms or may, alternatively, be provided by a separate platform having access to the plurality of platforms though an application programming interface. Similar to previous examples, the interface may allow the organizational administrator 842 to control platform-level settings, space-level settings, and/or content-level settings. Additionally or alternatively, a single organizational-level setting may be toggled enabling or disabling public access across the organization or enterprise. The settings designated by the organizational administrator 842 for the organization-level control 840 may be stored in a permissions profile of the respective organization level or tenant level.

Similar to the platform level control 830, discussed above, the organizational administrator 842 may preemptively disable public accessibility across a tenant or organization, which disables any lower level control of public access (e.g., by product administrators 832, space administrators 822 or creators 812). Thus, if and when the organizational administrator 842 does allow public accessibility under this scheme, no pages will be publicly available until designated by a lower level control (e.g., platform-level control 830, space-level control 820, or content item control 810). Once the organizational administrator 842 has allowed public accessibility controls to be enabled and product administrator 833, space administrator 822, or content creators 812 have exercised control and allowed public access to spaces or content items, those settings may be preserved if the organizational administrator 842 later disables public accessibility. Thus, a subsequent toggling action by the organizational administrator 842 turning public access off and then on again will not reset the individual settings of respective platform-level controls 830, space-level controls 820, and content item controls 810. Alternatively, in a different implementation, a toggling operation may reset all of the platform-level controls 830, space-level controls 820, and content item controls 810 to disable public access.

In some implementations, the content item level controls 810 are enabled in response to or only in accordance with each of the tenant-level 840, platform-level 830, and space-level 820 controls enabling public access. Using this scheme, any one of the higher-level control levels may disable public access resulting in a disabling of the public access control of the respective content item. This allows various administrators to monitor and easily control access to content on the system without having to reconcile a complex permissions scheme or waiting for multiple levels of approval. Conversely, user control may be permitted in situations in which the multiple levels of higher level administrative control are in agreement that public access is appropriate and permitted.

The multi-level control system 800 of FIG. 8 may also be referenced by the system when serving publicly accessible content. For example, before causing display of a content item in a client application of an unauthenticated user, the system may obtain a permissions profile of the content item, the respective content space, the respective platform and the respective tenant or organization. In accordance with all of the respective permission profiles permitting or authorizing unauthenticated user access, the content item (or respective portions of the content item) may be caused to be displayed or rendered in the client application of the unauthenticated user. In some cases, a single permissions data item or token may be associated with the respective content item and is updated or refreshed in response to a change in any of the higher-level control schemes. While this may improve the speed or responsiveness of accessing individual content items through the public service, it may create a load on the platform or across platforms as each individual permissions data item or token will need to be resolved in response to a number of events including a change in any of the enumerated controls or other system events, which may affect public permissions of the respective content. In some cases, it may be advantageous to resolve the permissions at the time of access by an unauthenticated user to ensure that the permissions reflect the current state of control even at the expense of a slight degradation in performance for the current user. Whether an evaluation of the current permissions status is based on a token or resolved in real time, the collection of data used to determine the current status may be generally referred to herein as a public-status permission profile or a public permission profile.

Figure 9A:
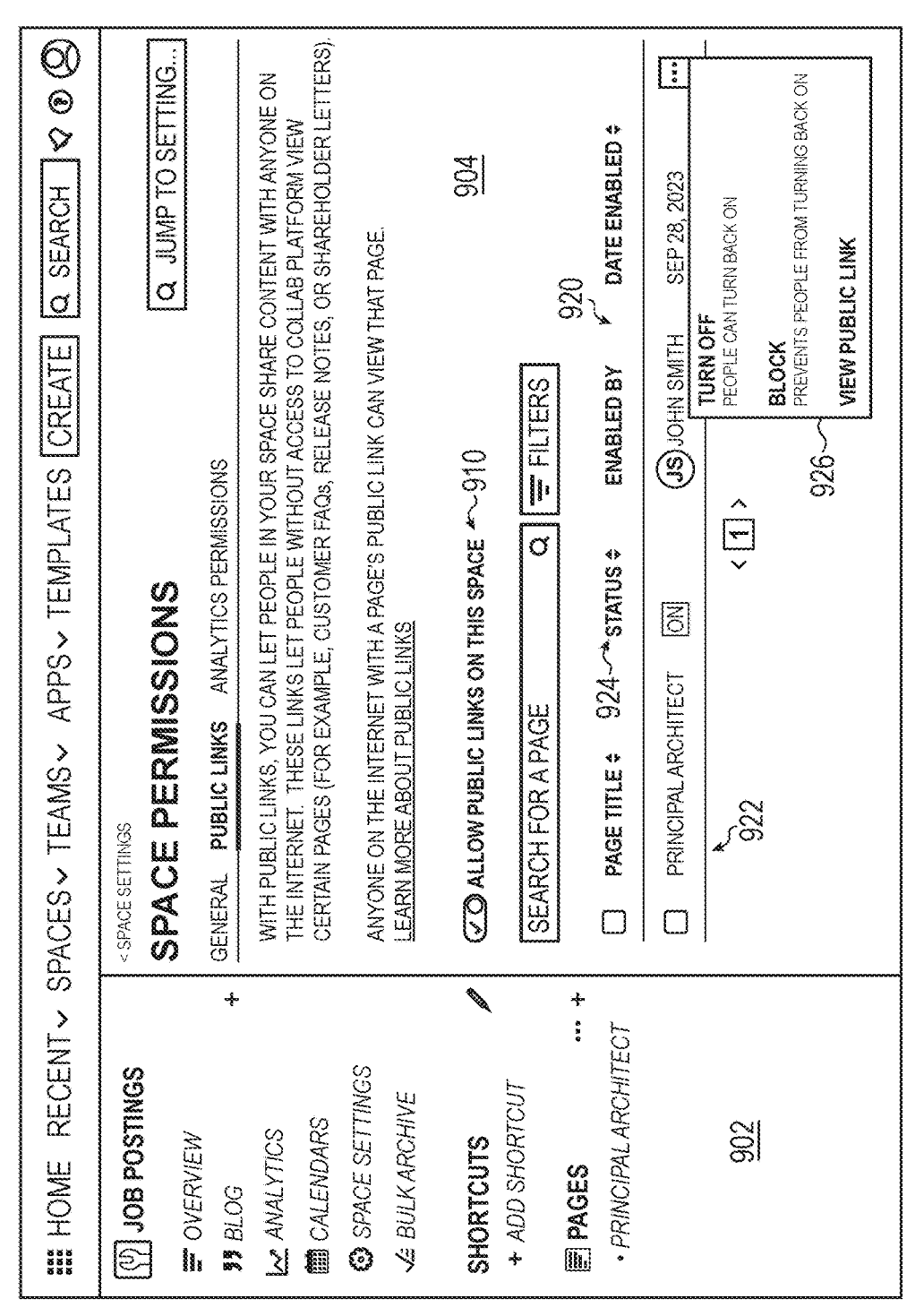
FIG. 9A depicts an example graphical user interface for visualizing and controlling aspects of a public-status permission profile with regard to a content space.

FIG. 9A depicts an example graphical user interface 900 for visualizing and controlling aspects of a public-status permission profile with regard to a content space. The graphical user interface 900 may be used to view and modify space-level controls discussed above with respect to FIG. 8. In the current example the user is able to toggle public permissions as enabled or disabled (on or off) using the slider control 910. Toggling permissions using the control 910 grants space-level permissions for all content items within the content space in a single action. Enabling public permissions with respect to the respective space using the control 910 may not result in any content items or pages being publicly viewable. As discussed above, with respect to FIG. 4, content-level or page-level settings may be controlled by the author or owner of the content item and, thus, if page-level settings do not allow for public access, the content item will not be publicly accessible. Similarly, if site-level permissions, platform-level permissions, or tenant-level permissions do not allow for public access, the space-level settings may not be operational.

Additionally, the user interface 900 also allows for content-item specific, space-level permissions controls and content-level controls using the content control interface 920, which may include a row or entry for multiple content items within the content space. In this example, the content control interface 920 includes a description of the content item, a selectable icon and name of the owner(s) or author(s) of the content item, a permission status indicator 924 and a control 922 for changing a public permission of the content item. The permission status indicator 924 indicates a current page-level permission status that may have been set by the owner or author using an interface similar to the example provided above with respect to FIG. 4. The permission control 922 also allows the space administrator to individually toggle the content-item level permissions, thereby overriding or modifying the setting provided by the owner or author.

The graphical user interface 900 also provides an additional control object or window 926, which allows the space administrator to exercise additional setting control with respect to the individual content item. Specifically, the administrator can simply toggle the control (on or off) while still allowing user-level control or the administrator can block public access and revoke user-level control. The window 926 also allows for other direct actions including an option to view the publicly available content item.

The graphical user interface 900 also allows the space administrator to navigate to other pages or other aspects of the system using the navigational panel 902, which includes a set of selectable elements, similar to previous examples. In some cases, the navigational panel 902 includes a hierarchical element tree (e.g., a page tree) that allows the administrator to view the permissions or content of the respective content items by selecting the respective element in the tree. Selected content and/or permissions is displayed in the content panel 904 in response to user selection of an element of the tree. The graphical user interface 900 also includes a toolbar and other controls similar to other examples, described herein.

Figure 9B:
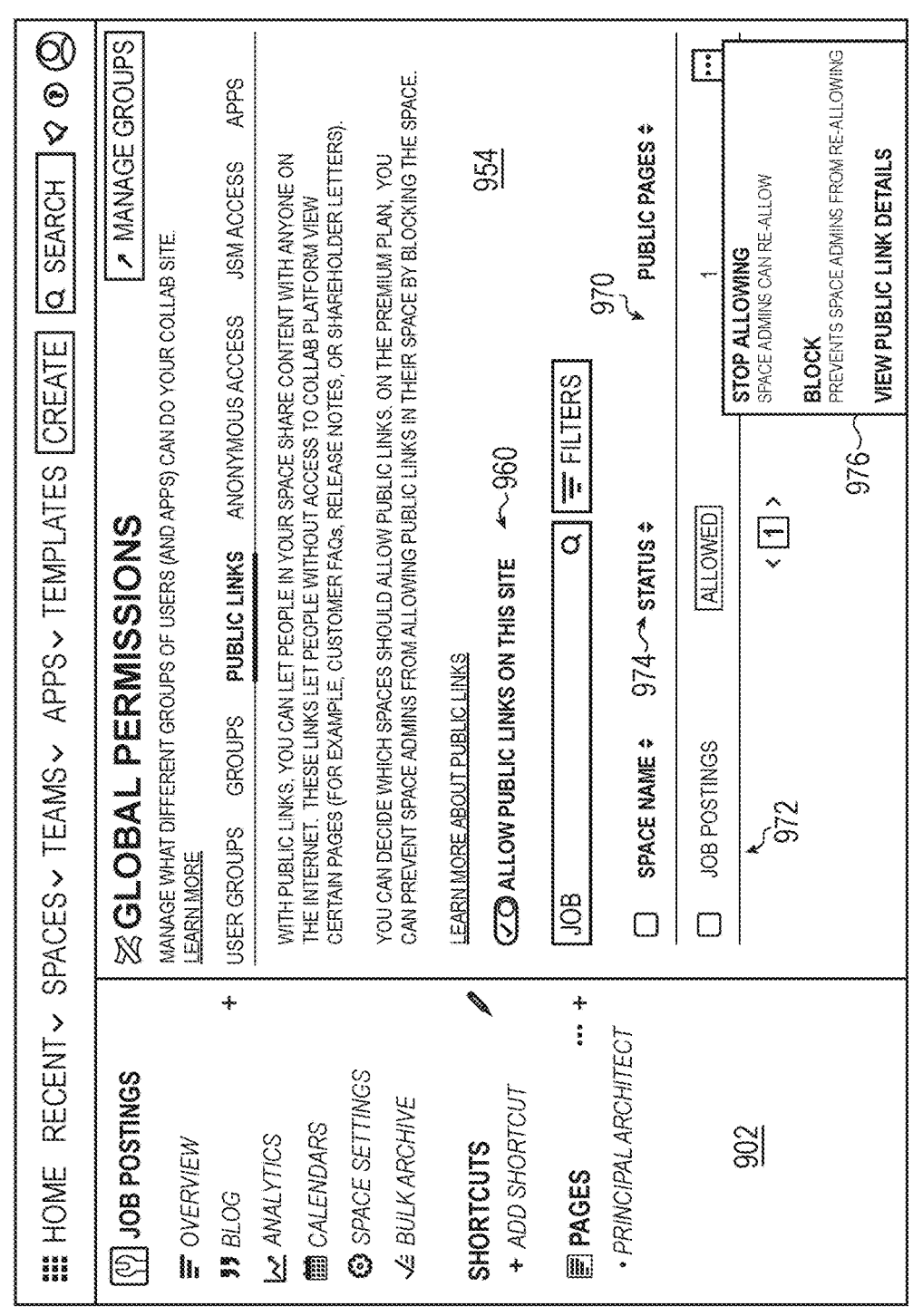
FIG. 9B depicts an example graphical user interface for visualizing and controlling aspects of a public-status permission profile with regard to a site or platform.

FIG. 9B depicts an example graphical user interface 950 for visualizing and controlling aspects of a public-status permission profile with regard to a site or platform. The graphical user interface 950 may be used to view and modify site-level or platform-level controls discussed above with respect to FIG. 8. In the current example the user is able to toggle public permissions as enabled or disabled (on or off) using the slider control 960. Toggling permissions using the control 960 grants site-level or platform-level permissions for all content items within the platform or managed by the site in a single action. Similar to the previous example, enabling public permissions with respect to the respective site or platform using the control 960 may not result in any content items or pages being publicly viewable. As discussed above, with respect to FIG. 4 and FIG. 9A, content-level or space-level settings may be controlled individually and, thus, if space-level settings and/or page-level settings do not allow for public access, the content item will not be publicly accessible. Similarly, if tenant-level permissions or other higher-level permissions do not allow for public access, the site-level or platform-level settings may not be operational.

Additionally, the user interface 950 also allows for space specific space-level permissions controls and content-level controls using the content control interface 970, which may include a row or entry for multiple content items and/or content spaces. In this example, the content control interface 970 includes a description of the space or content item, a selectable icon and name of the owner(s) or author(s) of the space or content item, a permission status indicator 974, and a control 972 for changing a public permission of the space or content item. The permission status indicator 974 indicates a current space-level or page-level permission status that may have been set by the owner or author using an interface similar to the example provided above with respect to FIG. 4 and FIG. 9A. The permission control 972 also allows the platform administrator to individually toggle the space-level permissions or content-item level permissions, thereby overriding or modifying other settings.

Similar to previous examples, the user interface 950 includes an additional control object or window 976, which allows the platform administrator to exercise additional setting control with respect to the individual space or content item. Specifically, the platform administrator can simply toggle the control (on or off) while still allowing lower-level control or the platform administrator can block public access and revoke lower-level control. The window 976 also allows for other direct actions including an option to view additional details regarding the public links.

In either of the graphical user interfaces 900 or 950 of FIGS. 9A and 9B, an option may be provided to view the state of all publicly available content items within the respective level of control. The examples depicted above are simplified for clarity and only depict a single item. However, in a typical implementation, a given space or a given platform may have multiple public content items, all of which may be visualized and controlled in a similar manner as described above with respect to FIGS. 900 and 950. This allows a respective administrator to have broad visibility and instant control of publicly accessible information, which may help reduce the risk of inadvertent disclosures or impacts on the system caused by user-level settings. In some cases, if the user has appropriate permissions, the graphical user interfaces or aspects thereof may also be combined in a single graphical user interface that allows for multiple levels of control in a common or composite interface.

Figure 10:
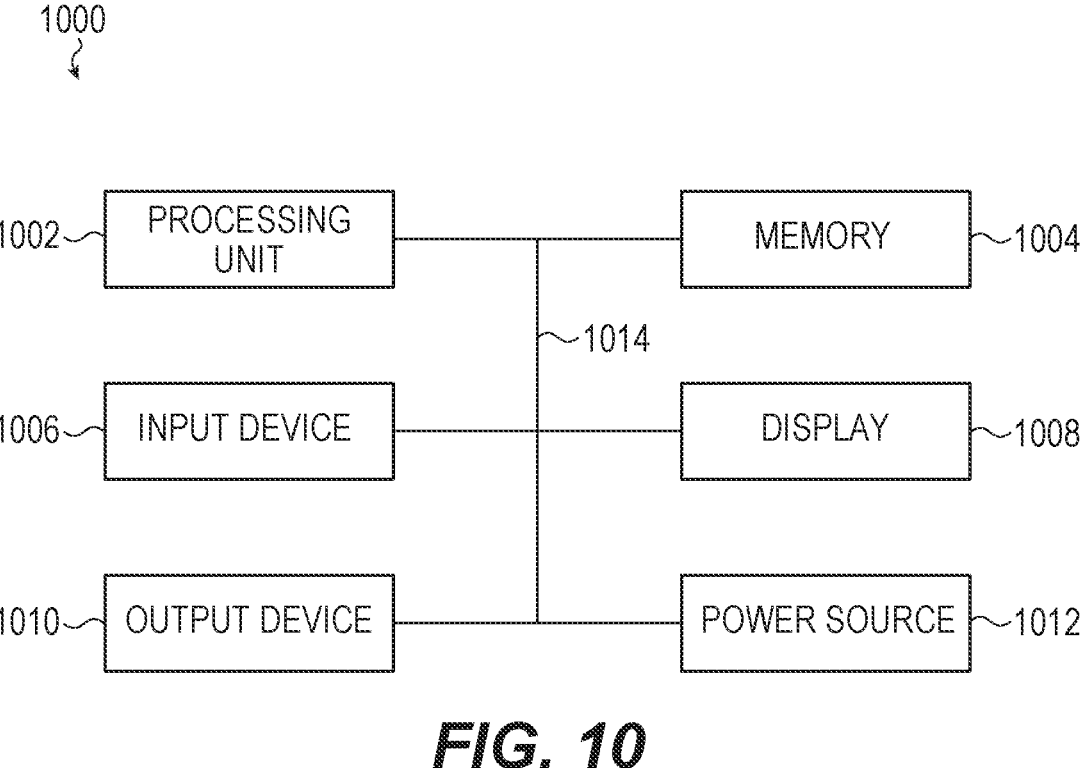
FIG. 10 depicts a schematic diagram of an electronic device that can execute one or more operations as described herein.

FIG. 10 shows a sample electrical block diagram of an electronic device 1000 that may perform the operations described herein. The electronic device 1000 may in some cases take the form of any of the electronic devices described with reference to FIGS. 1, 2A-2E. 3, and 4, including client devices, and/or servers or other computing devices associated with the content collaboration system 100. The electronic device 1000 can include one or more of a processing unit 1002, a memory 1004 or storage device, input device(s) 1006, a display 1008, output device(s) 1010, and a power source 1012. In some cases, various implementations of the electronic device 1000 may lack some or all of these components and/or include additional or alternative components.

The processing unit 1002 can control some or all of the operations of the electronic device 1000. The processing unit 1002 can communicate, either directly or indirectly, with some or all of the components of the electronic device 1000. For example, a system bus or other communication mechanism 1014 can provide communication between the processing unit 1002, the power source 1012, the memory 1004, the input device(s) 1006, and the output device(s) 1010.

The processing unit 1002 can be implemented as any electronic device capable of processing, receiving, or transmitting data or instructions. For example, the processing unit 1002 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements.

It should be noted that the components of the electronic device 1000 can be controlled by multiple processing units. For example, select components of the electronic device 1000 (e.g., an input device(s) 1006) may be controlled by a first processing unit and other components of the electronic device 1000 (e.g., the display 1008) may be controlled by a second processing unit, where the first and second processing units may or may not be in communication with each other.

The power source 1012 can be implemented with any device capable of providing energy to the electronic device 1000. For example, the power source 1012 may be one or more batteries or rechargeable batteries. Additionally, or alternatively, the power source 1012 can be a power connector or power cord that connects the electronic device 1000 to another power source, such as a wall outlet.

The memory 1004 can store electronic data that can be used by the electronic device 1000. For example, the memory 1004 can store electronic data or content such as, for example, audio and video files, documents and applications, device settings and user preferences, timing signals, control signals, and data structures or databases. The memory 1004 can be configured as any type of memory. By way of example only, the memory 1004 can be implemented as random access memory, read-only memory, Flash memory, removable memory, other types of storage elements, or combinations of such devices.

In various embodiments, the display 1008 provides a graphical output, for example, associated with an operating system, user interface, and/or applications of the electronic device 1000 (e.g., a chat user interface, an issue-tracking user interface, an issue-discovery user interface, etc.). In one embodiment, the display 1008 includes one or more sensors and is configured as a touch-sensitive (e.g., single-touch, multi-touch) and/or force-sensitive display to receive inputs from a user. For example, the display 1008 may be integrated with a touch sensor (e.g., a capacitive touch sensor) and/or a force sensor to provide a touch- and/or force-sensitive display. The display 1008 is operably coupled to the processing unit 1002 of the electronic device 1000.

The display 1008 can be implemented with any suitable technology, including, but not limited to, liquid crystal display (LCD) technology, light-emitting diode (LED) technology, organic light-emitting display (OLED) technology, organic electroluminescence (OEL) technology, or another type of display technology. In some cases, the display 1008 is positioned beneath and viewable through a cover that forms at least a portion of an enclosure of the electronic device 1000.

In various embodiments, the input devices 1006 may include any suitable components for detecting inputs. Examples of input devices 1006 include light sensors, temperature sensors, audio sensors (e.g., microphones), optical or visual sensors (e.g., cameras, visible light sensors, or invisible light sensors), proximity sensors, touch sensors, force sensors, mechanical devices (e.g., crowns, switches, buttons, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, and so on, or some combination thereof. Each input device 1006 may be configured to detect one or more particular types of input and provide a signal (e.g., an input signal) corresponding to the detected input. The signal may be provided, for example, to the processing unit 1002.

As discussed above, in some cases, the input device(s) 1006 include a touch sensor (e.g., a capacitive touch sensor) integrated with the display 1008 to provide a touch-sensitive display. Similarly, in some cases, the input device(s) 1006 include a force sensor (e.g., a capacitive force sensor) integrated with the display 1008 to provide a force-sensitive display.

The output devices 1010 may include any suitable components for providing outputs. Examples of output devices 1010 include light emitters, audio output devices (e.g., speakers), visual output devices (e.g., lights or displays), tactile output devices (e.g., haptic output devices), communication devices (e.g., wired or wireless communication devices), and so on, or some combination thereof. Each output device 1010 may be configured to receive one or more signals (e.g., an output signal provided by the processing unit 1002) and provide an output corresponding to the signal.

In some cases, input devices 1006 and output devices 1010 are implemented together as a single device. For example, an input/output device or port can transmit electronic signals via a communications network, such as a wireless and/or wired network connection. Examples of wireless and wired network connections include, but are not limited to, cellular, Wi-Fi, Bluetooth, IR, and Ethernet connections.

The processing unit 1002 may be operably coupled to the input device(s) 1006 and the output device(s) 1010. The processing unit 1002 may be adapted to exchange signals with the input device(s) 1006 and the output device(s) 1010. For example, the processing unit 1002 may receive an input signal from an input device(s) 1006 that corresponds to an input detected by the input device 1 (s) 006. The processing unit 1002 may interpret the received input signal to determine whether to provide and/or change one or more outputs in response to the input signal. The processing unit 1002 may then send an output signal to one or more of the output device(s) 1010, to provide and/or change outputs as appropriate.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the embodiments of the invention, whether or not such embodiments are described, and whether or not such features are presented as being a part of a described embodiment. Thus, the breadth and scope of the present invention should not be limited by any of the above-described exemplary embodiments but is instead defined by the claims herein presented.

Furthermore, the foregoing examples and description of instances of purpose-configured software, whether accessible via API as a request-response service, an event-driven service, or whether configured as a self-contained data processing service are understood as not exhaustive. In other words, a person of skill in the art may appreciate that the various functions and operations of a system such as described herein can be implemented in a number of suitable ways, leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments described herein are described in reference to an implementation in which discrete functions of the system are implemented as discrete microservices. It is appreciated that this is merely one possible implementation.

In addition, it is understood that organizations and/or entities responsible for the access, aggregation, validation, analysis, disclosure, transfer, storage, or other use of private data such as described herein will preferably comply with published and industry-established privacy, data, and network security policies and practices. For example, it is understood that data and/or information obtained from remote or local data sources, only on informed consent of the subject of that data and/or information, should be accessed only for legitimate, agreed-upon, and reasonable uses.

What is claimed is:

1. A computer-implemented method of providing user-generated pages of a content collaboration platform, the method comprising:

in response to a first user input at a graphical user interface of the content collaboration platform, causing creation of a page comprising user-generated content, the user-generated content comprising:

text content;

selectable graphical objects, each selectable graphical object is user-selectable to cause redirection to a respective target content item and display content extracted from the target content item; and one or more graphical items generated by a set of macro instructions associated with the page;

in response to a first request to view the page from an authenticated user, causing display of the page in a first client application associated with the authenticated user, the page displayed with the text content, the selectable graphical objects, and the one or more graphical items;

in response to a second request to view the page from an unauthenticated user, suppressing display of the page in a second client application associated with the unauthenticated user;

in response to a second user input to the graphical user interface, modifying a public-status permission profile of the page and, in accordance with the public-status permission profile granting access, enabling public access to the page for unauthenticated users;

generating a public address comprising a first domain portion and a second domain portion corresponding to an external content identifier of the page;

subsequent to enabling public access to the page and in response to a third request to view the page via the public address from the unauthenticated user, obtaining the public-status permission profile of the page using the external content identifier and an internal content identifier of the page; and in response to an evaluation of the public-status permission profile indicating that public access is currently granted, causing display of the page in the second client application associated with the unauthenticated user, the page displayed with the text content and without the selectable graphical objects and the one or more graphical items.

2. The computer-implemented method of claim 1, wherein:

the public-status permission profile is based on a hierarchical permission scheme comprising:

a first permission level based on a first permissions profile of the page;

a second permission level based on a second permissions profile of a page space that includes the page and a plurality of other pages;

a third permission level based on a third permission profile of a platform hosting the page space and a plurality of other page spaces; and a fourth permission level based on a fourth permission profile of a tenant providing the platform and a plurality of other platforms.

3. The computer-implemented method of claim 2, wherein in accordance with the first, second, third, and fourth permission levels permitting unauthenticated user access, the public-status permission profile indicates that public access is currently granted.

4. The computer-implemented method of claim 2, wherein:

the public-status permission profile is stored in a cache as a cached permission profile; and the cached permission profile is modified in response to one or more events generated by the content collaboration platform.

5. The computer-implemented method of claim 4, wherein the one or more events include one or more of:

a movement of the page from a first page space to a second page space;

a change in ownership of the page with respect to one or more system users; or a change to a the first, second, third or fourth permission levels.

6. The computer-implemented method of claim 1, wherein:

causing display of the page in the second client application further comprises:

checking for a cached version of the page in a page cache of the content collaboration platform;

in response to the cached version of the page being stored in the page cache, retrieving at least a portion of the user-generated content from the page cache; and in response to the cached version of the page being absent from the page cache, retrieving at least a portion of the user-generated content from a page store of the content collaboration platform and causing retrieved user-generated content to be stored in the page cache.

7. The computer-implemented method of claim 6, wherein:

the page is a first page and the public address is a first public address;

in response to a fourth request to view a second page using a second public address from the unauthenticated user:

checking for a cached version of the second page in the page cache of the content collaboration platform;

in response to the cached version of the second page being stored in the page cache, retrieving respective user-generated content from the page cache;

in response to the cached version of the second page being absent from the page cache and in response to a request criteria being satisfied, retrieving the respective user-generated content of the second page from the page store of the content collaboration platform and causing the respective user-generated content to be stored in the page cache; and in response to the cached version of the second page being absent from the page cache and in response to the request criteria not being satisfied, denying access to the second page.

8. The computer-implemented method of claim 7, wherein:

the request criteria includes a number of times a respective page can be requested within a predetermined time period; and the request criteria is not satisfied when a particular number of times the second page has been requested within the predetermined time period exceeds a request threshold.

9. The computer-implemented method of claim 1, wherein:

the target content item of the selectable graphical objects is another page provided by the content collaboration platform; and the one or more graphical items include content obtained from a platform different than the content collaboration platform.

10. The computer-implemented method of claim 1, wherein:

the first client application is a first instance of a browser application operating on a first client device of the first user; and the second client application is a second instance of the browser application operating on a second client device of the second user.

11. A computer-implemented method of providing user-generated pages of a content collaboration platform, the method comprising:

in response to a first request to view a page of the content collaboration platform from an authenticated user, causing display of the page in a first client application associated with the authenticated user, the page displayed with text content and one or more graphical items generated by a set of macro instructions associated with the page;

in response to a second request to view the page from an unauthenticated user, blocking display of the page in a second client application associated with the unauthenticated user;

in response to a user input to a graphical user interface associated with the page, enabling public access to the page for unauthenticated users by modifying a first permissions profile of the page;

generating a public address comprising a first domain portion and a second domain portion corresponding to a shared content ID of the page;

subsequent to enabling public access to the page and in response to a third request to view the page via the public address from the unauthenticated user:

determining a first permission level based on the first permissions profile of the page;

determining a second permission level based on a second permissions profile of a page space that includes the page and a plurality of other pages;

determining a third permission level based on a third permission profile of a platform hosting the page space and a plurality of other page spaces; and determining a fourth permission level based on a fourth permission profile of a tenant providing the platform and a plurality of other platforms; and in accordance with the first, second, third, and fourth permission levels allowing public access, causing display of the page in the second client application associated with the unauthenticated user, the page displayed with the text content and without the one or more graphical items.

12. The computer-implemented method of claim 11, wherein:

in accordance with the fourth permission level disabling public access, preventing public access to any pages hosted on behalf of the tenant;

in accordance with the third permission level disabling public access, preventing public access to any pages of the platform; and in accordance with the second permission level disabling public access, preventing public access to any pages of the page space.

13. The computer-implemented method of claim 11, wherein subsequent to enabling public access to the page, maintaining a secure address for the page and the public access to the page.

14. The computer-implemented method of claim 13, wherein:

subsequent to enabling public access to the page and in response to a fourth request to view the page via the secure address, verifying an authentication of a requesting user; and in response to the requesting user having a valid authentication, causing display of the page with the text content and the one or more graphical items generated by the set of macro instructions associated with the page.

15. The computer-implemented method of claim 11, wherein:

a graphical item of the one or more graphical items generated by the set of macro instructions associated with the page includes an embedded graphic; and the embedded graphic is extracted from a content item hosted by an external platform that is separate from the content collaboration platform.

16. The computer-implemented method of claim 11, wherein:

a graphical item of the one or more graphical items generated by the set of macro instructions associated with the page includes a selectable graphical object; and the selectable graphical object is user selectable to cause redirection of the graphical user interface to a respective content item.

17. The computer-implemented method of claim 11, wherein:

in response to a third user input to the first client application the method comprises enabling editing of page content of the page to generate a modified page; and subsequent to generating the modified page and in response to a fourth request to view the page via the public address from the unauthenticated user, causing display of the modified page.

18. A computer-implemented method of providing user-generated pages of a content collaboration platform, the method comprising:

in response to a first request to view a page of the content collaboration platform from an authenticated user, causing display of the page in a first client application associated with the authenticated user, the page displayed with page content including text content and one or more graphical items linked to other content items;

in response to a second request to view the page from an unauthenticated user, preventing display of the page in a second client application associated with the unauthenticated user;

in response to a user input with respect to a graphical user interface displaying the page, the user input associated with a request to modify a first permission profile of the page to allow unauthenticated user access:

determining a second permission level based on a second permissions profile of a page space that includes the page and a plurality of other pages; and determining a third permission level based on a third permission profile of a platform hosting the page space and a plurality of other page spaces; and in accordance with the first, second, and third permission levels allowing unauthenticated user access, modifying the first permission profile to allow unauthenticated user access, and generating a public address comprising a first domain portion and a second domain portion corresponding to a content identifier of the page;

subsequent to modifying the first permission profile to allow unauthenticated user access and in response to a third request to view the page via the public address from the unauthenticated user, retrieving at least a portion of the page content using the second domain portion; and causing display of the page in the second client application associated with the unauthenticated user, the page displayed with the text content and without the one or more graphical items linked to other content items.

19. The computer-implemented method of claim 18, wherein subsequent to modifying the first permission profile to allow unauthenticated user access and in response to the third request to view the page via the public address from the unauthenticated user, verifying that the first, second, third, and fourth permission levels allow public access before causing display of the page.

20. The computer-implemented method of claim 18, wherein:

retrieving the at least the portion of the page content using the second domain portion comprises:

checking for a cached version of the page in a page cache of the content collaboration platform;

in response to the cached version of the page being stored in the page cache, retrieving the at least the portion of the page content from the page cache; and in response to the cached version of the page being absent from the page cache, retrieving the at least the portion of page content from a page store of the content collaboration platform and causing the cached version of the page to be stored in the page cache.

21. The computer-implemented method of claim 18, wherein the first client application is configured to allow editing of the page content by the authenticated user in accordance with page providing edit permissions with respect to the authenticated user.

22. The computer-implemented method of claim 21, wherein subsequent to the authenticated user editing the page content to create a modified page and in response to a fourth request to view the page via the public address from the unauthenticated user, causing the modified page to be displayed.

23. The computer-implemented method of claim 18, wherein:

the one or more graphical items linked to other content items are selectable graphical objects; and the selectable graphical objects include embedded content extracted from other content items.

* * * * *